(12) United States Patent
Geva

(10) Patent No.: US 12,254,239 B1
(45) Date of Patent: Mar. 18, 2025

(54) PREDICTING AMPLIFICATION FOR BROADCASTS FROM PERSONAL DEVICES

(71) Applicant: Amazon Technologies, Inc., Seattle, WA (US)

(72) Inventor: Yoav Vince Geva, Denver, CO (US)

(73) Assignee: Amazon Technologies, Inc., Seattle, WA (US)

( * ) Notice: Subject to any disclaimer, the term of this patent is extended or adjusted under 35 U.S.C. 154(b) by 239 days.

(21) Appl. No.: 17/950,413

(22) Filed: Sep. 22, 2022

(51) Int. Cl.
  *G06F 3/16* (2006.01)
  *G10L 25/51* (2013.01)
  *H04H 20/86* (2008.01)

(52) U.S. Cl.
  CPC .............. *G06F 3/165* (2013.01); *G10L 25/51* (2013.01); *H04H 20/86* (2013.01)

(58) Field of Classification Search
  CPC .......... G06F 3/165; G10L 25/51; H04H 20/86
  See application file for complete search history.

(56) References Cited

U.S. PATENT DOCUMENTS

| | | | |
|---|---|---|---|
| 5,570,424 | A | 10/1996 | Araya et al. |
| 5,832,435 | A | 11/1998 | Silverman |
| 8,023,800 | B2 | 9/2011 | Concotelli |
| 8,112,720 | B2 | 2/2012 | Curtis |
| 8,560,683 | B2 | 10/2013 | Funk et al. |
| 8,572,243 | B2 | 10/2013 | Funk et al. |
| 8,768,782 | B1 | 7/2014 | Myslinski |
| 8,850,301 | B1 | 9/2014 | Rose |
| 9,003,032 | B2 | 4/2015 | Funk et al. |
| 9,369,740 | B1 | 6/2016 | Funk et al. |
| 9,613,636 | B2 | 4/2017 | Gibbon et al. |
| 9,706,253 | B1 | 7/2017 | Funk et al. |
| 9,729,596 | B2 | 8/2017 | Sanghavi et al. |

(Continued)

FOREIGN PATENT DOCUMENTS

| | | |
|---|---|---|
| AU | 2013204532 B2 | 11/2014 |
| CA | 2977959 A1 | 9/2016 |

(Continued)

OTHER PUBLICATIONS

B. Subin, "Spotify for Android Tests New Floating Mini Player UI / Beebom," URL: https://beebom.com/spotify-tests-new-mini-player-android/, retrieved on Aug. 26, 2023, 3 pages.

(Continued)

*Primary Examiner* — Akelaw Teshale
(74) *Attorney, Agent, or Firm* — Athorus, PLLC

(57) ABSTRACT

Gain factors for amplifying audio data of live broadcasts from mobile devices are selected to ensure that distortions of audio data subsequently generated during the live broadcasts remain within targeted distortion ranges. When a creator initiates a live broadcast from a personal device, audio data captured by the personal device is subjected to amplification and a level of distortion of the audio data is determined. A gain factor for amplifying audio data subsequently captured during the live broadcast is calculated based on a previous gain factor, as well as distortion of the audio data resulting from hard or soft clipping, or any other basis. The gain factor may increase, decrease or remain constant, depending on the prior gain factor and the previously observed distortion.

20 Claims, 12 Drawing Sheets

(56) References Cited

U.S. PATENT DOCUMENTS

| | | | |
|---|---|---|---|
| 9,781,491 B2 | 10/2017 | Wilson | |
| 9,872,069 B1 | 1/2018 | Funk et al. | |
| 10,015,589 B1* | 7/2018 | Ebenezer | H04R 3/005 |
| 10,083,169 B1 | 9/2018 | Ghosh et al. | |
| 10,091,547 B2 | 10/2018 | Sheppard et al. | |
| 10,110,952 B1 | 10/2018 | Gupta et al. | |
| 10,135,887 B1 | 11/2018 | Esser et al. | |
| 10,140,364 B1 | 11/2018 | Diamondstein | |
| 10,178,422 B1 | 1/2019 | Panchaksharaiah et al. | |
| 10,178,442 B2 | 1/2019 | Shkedi | |
| 10,264,213 B1* | 4/2019 | Sculley | H04L 65/403 |
| 10,313,726 B2 | 6/2019 | Woods et al. | |
| 10,356,476 B2 | 7/2019 | Dharmaji | |
| 10,432,335 B2 | 10/2019 | Bretherton | |
| 10,489,395 B2 | 11/2019 | Lakkur et al. | |
| 10,685,050 B2 | 6/2020 | Krishna et al. | |
| 10,698,906 B2* | 6/2020 | Hargreaves | G06Q 30/0201 |
| 10,700,648 B2* | 6/2020 | Lesso | H03F 1/3247 |
| 10,719,837 B2 | 7/2020 | Kolowich et al. | |
| 10,769,678 B2 | 9/2020 | Li | |
| 10,846,330 B2 | 11/2020 | Shilo | |
| 10,893,329 B1 | 1/2021 | Trim et al. | |
| 10,985,853 B2 | 4/2021 | Bretherton | |
| 10,986,064 B2 | 4/2021 | Siegel et al. | |
| 10,997,240 B1 | 5/2021 | Aschner et al. | |
| 11,431,660 B1 | 8/2022 | Leeds et al. | |
| 11,451,863 B1 | 9/2022 | Benjamin et al. | |
| 11,463,772 B1 | 10/2022 | Wanjari et al. | |
| 11,521,179 B1 | 12/2022 | Shetty | |
| 11,539,845 B1* | 12/2022 | Fowers | H04L 65/403 |
| 11,580,982 B1 | 2/2023 | Karnawat et al. | |
| 11,586,344 B1 | 2/2023 | Balagurunathan et al. | |
| 11,605,387 B1 | 3/2023 | Muralitharan et al. | |
| 11,900,902 B2* | 2/2024 | Martinez Ramirez | H03G 3/32 |
| 11,916,981 B1* | 2/2024 | Karnawat | G10L 15/26 |
| 2002/0042920 A1 | 4/2002 | Thomas et al. | |
| 2002/0056087 A1 | 5/2002 | Berezowski et al. | |
| 2003/0117486 A1* | 6/2003 | Ferren | H04N 7/147 |
| | | | 348/E7.083 |
| 2004/0057586 A1* | 3/2004 | Licht | H03G 3/32 |
| | | | 381/94.1 |
| 2005/0201360 A1* | 9/2005 | Redstone | H04L 12/66 |
| | | | 370/352 |
| 2005/0213726 A1* | 9/2005 | Rodman | H04M 3/567 |
| | | | 379/202.01 |
| 2005/0213734 A1* | 9/2005 | Rodman | H04N 7/152 |
| | | | 379/202.01 |
| 2005/0213735 A1* | 9/2005 | Rodman | H04L 12/1822 |
| | | | 379/202.01 |
| 2006/0018457 A1* | 1/2006 | Unno | H04M 9/082 |
| | | | 379/388.04 |
| 2006/0018458 A1* | 1/2006 | McCree | H04M 9/082 |
| | | | 379/406.01 |
| 2006/0268667 A1 | 11/2006 | Jellison et al. | |
| 2007/0124756 A1 | 5/2007 | Covell et al. | |
| 2007/0271518 A1 | 11/2007 | Tischer et al. | |
| 2007/0271580 A1 | 11/2007 | Tischer et al. | |
| 2008/0086742 A1 | 4/2008 | Aldrey et al. | |
| 2009/0044217 A1 | 2/2009 | Lutterbach et al. | |
| 2009/0076917 A1 | 3/2009 | Jablokov et al. | |
| 2009/0100098 A1 | 4/2009 | Feher et al. | |
| 2009/0254934 A1 | 10/2009 | Grammens | |
| 2009/0298417 A1* | 12/2009 | Phillips | H04H 20/02 |
| | | | 455/3.04 |
| 2010/0088187 A1 | 4/2010 | Courtney et al. | |
| 2010/0280641 A1 | 11/2010 | Harkness et al. | |
| 2011/0063406 A1 | 3/2011 | Albert et al. | |
| 2011/0067044 A1 | 3/2011 | Albo | |
| 2011/0267419 A1* | 11/2011 | Quinn | G06F 3/04842 |
| | | | 348/E7.083 |
| 2012/0040604 A1 | 2/2012 | Amidon et al. | |
| 2012/0191774 A1 | 7/2012 | Bhaskaran et al. | |
| 2012/0304206 A1 | 11/2012 | Roberts et al. | |
| 2012/0311444 A1 | 12/2012 | Chaudhri | |
| 2012/0311618 A1 | 12/2012 | Blaxland | |
| 2012/0331168 A1 | 12/2012 | Chen | |
| 2013/0074109 A1 | 3/2013 | Skelton et al. | |
| 2013/0247081 A1 | 9/2013 | Vinson et al. | |
| 2013/0253934 A1 | 9/2013 | Parekh et al. | |
| 2014/0019225 A1 | 1/2014 | Guminy et al. | |
| 2014/0040494 A1 | 2/2014 | Deinhard et al. | |
| 2014/0068432 A1 | 3/2014 | Kucharz et al. | |
| 2014/0073236 A1 | 3/2014 | Iyer | |
| 2014/0108531 A1 | 4/2014 | Klau | |
| 2014/0123191 A1 | 5/2014 | Hahn et al. | |
| 2014/0228010 A1 | 8/2014 | Barbulescu et al. | |
| 2014/0325557 A1 | 10/2014 | Evans et al. | |
| 2014/0372179 A1 | 12/2014 | Ju et al. | |
| 2015/0095014 A1 | 4/2015 | Marimuthu | |
| 2015/0163184 A1 | 6/2015 | Kanter et al. | |
| 2015/0242068 A1 | 8/2015 | Losey et al. | |
| 2015/0248798 A1 | 9/2015 | Howe et al. | |
| 2015/0289021 A1 | 10/2015 | Miles | |
| 2015/0319472 A1 | 11/2015 | Kotecha et al. | |
| 2015/0326922 A1 | 11/2015 | Givon et al. | |
| 2016/0027196 A1 | 1/2016 | Schiffer et al. | |
| 2016/0093289 A1 | 3/2016 | Pollet | |
| 2016/0188728 A1 | 6/2016 | Gill et al. | |
| 2016/0217488 A1 | 7/2016 | Ward et al. | |
| 2016/0266781 A1 | 9/2016 | Dandu et al. | |
| 2016/0291926 A1* | 10/2016 | Hundemer | H04H 20/20 |
| 2016/0293036 A1 | 10/2016 | Niemi et al. | |
| 2016/0330529 A1 | 11/2016 | Byers | |
| 2017/0127136 A1 | 5/2017 | Roberts et al. | |
| 2017/0164357 A1 | 6/2017 | Fan et al. | |
| 2017/0193531 A1 | 7/2017 | Fatourechi et al. | |
| 2017/0213248 A1 | 7/2017 | Jing et al. | |
| 2017/0289617 A1 | 10/2017 | Song et al. | |
| 2017/0329466 A1 | 11/2017 | Krenkler et al. | |
| 2017/0366854 A1 | 12/2017 | Puntambekar et al. | |
| 2018/0025078 A1 | 1/2018 | Quennesson | |
| 2018/0035142 A1 | 2/2018 | Rao et al. | |
| 2018/0184213 A1* | 6/2018 | Lesimple | H04R 25/356 |
| 2018/0205797 A1 | 7/2018 | Faulkner | |
| 2018/0227632 A1 | 8/2018 | Rubin et al. | |
| 2018/0234069 A1 | 8/2018 | Burgh | |
| 2018/0255114 A1 | 9/2018 | Dharmaji | |
| 2018/0293221 A1 | 10/2018 | Finkelstein et al. | |
| 2018/0322411 A1 | 11/2018 | Wang et al. | |
| 2018/0367229 A1 | 12/2018 | Gibson et al. | |
| 2019/0065610 A1 | 2/2019 | Singh | |
| 2019/0132636 A1 | 5/2019 | Gupta et al. | |
| 2019/0156196 A1 | 5/2019 | Zoldi et al. | |
| 2019/0171762 A1 | 6/2019 | Luke et al. | |
| 2019/0273570 A1 | 9/2019 | Bretherton | |
| 2019/0327103 A1 | 10/2019 | Niekrasz | |
| 2019/0364359 A1* | 11/2019 | Ferguson | A61K 9/5031 |
| 2019/0385600 A1 | 12/2019 | Kim | |
| 2020/0021888 A1 | 1/2020 | Brandao et al. | |
| 2020/0106885 A1 | 4/2020 | Koster et al. | |
| 2020/0160458 A1 | 5/2020 | Bodin et al. | |
| 2020/0226418 A1 | 7/2020 | Dorai-Raj et al. | |
| 2020/0279553 A1 | 9/2020 | McDuff et al. | |
| 2020/0364727 A1 | 11/2020 | Scott-Green et al. | |
| 2021/0090224 A1 | 3/2021 | Zhou et al. | |
| 2021/0104245 A1 | 4/2021 | Alas et al. | |
| 2021/0105149 A1 | 4/2021 | Roedel et al. | |
| 2021/0125054 A1 | 4/2021 | Banik et al. | |
| 2021/0160588 A1 | 5/2021 | Joseph et al. | |
| 2021/0210102 A1 | 7/2021 | Huh et al. | |
| 2021/0217413 A1 | 7/2021 | Tushinskiy et al. | |
| 2021/0224319 A1 | 7/2021 | Ingel et al. | |
| 2021/0232577 A1 | 7/2021 | Ogawa et al. | |
| 2021/0256086 A1 | 8/2021 | Askarian et al. | |
| 2021/0281925 A1 | 9/2021 | Shaikh et al. | |
| 2021/0366462 A1 | 11/2021 | Yang et al. | |
| 2021/0374391 A1* | 12/2021 | Jorasch | G06V 40/19 |
| 2021/0407520 A1 | 12/2021 | Neckermann et al. | |
| 2022/0038783 A1 | 2/2022 | Wee | |
| 2022/0038790 A1 | 2/2022 | Duan et al. | |
| 2022/0159377 A1 | 5/2022 | Wilberding et al. | |
| 2022/0223286 A1 | 7/2022 | Ach et al. | |
| 2022/0230632 A1 | 7/2022 | Maitra et al. | |

(56) References Cited

U.S. PATENT DOCUMENTS

| | | | |
|---|---|---|---|
| 2022/0254348 A1 | 8/2022 | Tay et al. | |
| 2022/0286748 A1 | 9/2022 | Dyer et al. | |
| 2022/0369034 A1 | 11/2022 | Kumar et al. | |
| 2022/0415327 A1* | 12/2022 | Fowers | G10L 15/26 |
| 2022/0417297 A1 | 12/2022 | Daga et al. | |
| 2023/0036192 A1 | 2/2023 | Alakoye | |
| 2023/0085683 A1 | 3/2023 | Turner | |
| 2023/0217195 A1 | 7/2023 | Poltorak | |
| 2024/0031489 A1* | 1/2024 | Lundin | H04M 3/568 |

FOREIGN PATENT DOCUMENTS

| | | |
|---|---|---|
| CN | 104813305 A | 7/2015 |
| DE | 112020002288 | 2/2022 |
| EP | 1681669 A1 | 7/2006 |
| EP | 3779960 A1 | 2/2021 |
| KR | 20170079496 A | 7/2017 |
| WO | 2019089028 A1 | 5/2019 |

OTHER PUBLICATIONS

Matt Ellis, "Desktop vs. mobile app design: how to optimize your user experience—99 designs," URL: https://99designs.com/blog/web-digital/desktop-vs-mobile-app-design/, retrieved Aug. 26, 2023, 12 pages.

Salesforce, "Introducing a profile page as sleek as a Tableau Public viz," https://www.tableau.com/, Tableau Software, LLC, a Salesforce Company, Jul. 21, 2021. Accessed Aug. 31, 2023. URL: https://www.tableau.com/blog/introducing-profile-page-sleek-tableau-public-viz, 7 pages.

Arora, S. et al., "A Practical Algorithm for Topic Modeling with Provable Guarantees," Proceedings in the 30th International Conference on Machine Learning, JMLR: W&CP vol. 28, published 2013 (Year: 2013), 9 pages.

Github, "Spotify iOS SDK," GitHub.com, GitHub Inc. and GitHub B.V., Feb. 17, 2021, available at URL: https://github.com/spotify/ios-sdk#how-do-app-remote-calls-work, 10 pages.

Stack Overflow, "Audio mixing of Spotify tracks in IOS app," stackoverflow.com, Stack Overflow Network, Jul. 2012, available at URL: https://stackoverflow.com/questions/11396348/audio-mixing-of-spotify-tracks-in-ios-app, 2 pages.

Tengeh, R. K., & Udoakpan, N. (2021). Over-the-Top Television Services and Changes in Consumer Viewing Patterns in South Africa. Management Dynamics in the Knowledge Economy. 9(2), 257-277. DOI 10.2478/mdke-2021-0018 ISSN: 2392-8042 (online) www.managementdynamics.ro; URL: https://content.sciendo.com/view/journals/mdke/mdke-overview.xml.

Hoegen, Rens, et al. "An End-to-End Conversational Style Matching Agent." Proceedings of the 19th ACM International Conference on Intelligent Virtual Agents. 2019, pp. 1-8. (Year: 2019).

* cited by examiner

PREDICTING AMPLIFICATION FOR BROADCASTS FROM PERSONAL DEVICES

BACKGROUND

Traditional radio stations (e.g., a terrestrial radio station, or a satellite radio station) typically rely on extensive physical systems and infrastructure to broadcast audio signals to devices of listeners. For example, radio stations commonly operate from facilities having studios with dedicated rooms including microphones, cameras or other capture devices, as well as consoles including one or more fades, sliders or switches for controlling audio signals that are received from creators, hosts, guests or other personnel, or previously recorded audio signals (e.g., advertisements, music, news, sports, weather, or other programming), and transmitted to listeners. Such studios or facilities often include playback devices for generating audio signals, rooms having large racks of servers or other computer systems, and transmission lines extending between such facilities and one or more antennas. Furthermore, in addition to hosts, radio stations typically employ dozens of other personnel, including sound engineers, maintenance engineers, production directors, or station managers, as well as producers of advertisements, music, news, sports, weather, or other programming. Such facilities and personnel may process audio signals to ensure that a live broadcast of a media program has levels of quality and clarity that are as high as practicable.

For this reason, most live broadcasts of media programs are conducted from in-studio locations, and not from locations where content may be uniquely generated on extremely short notice, or from locations where content may be particularly pertinent.

Some Internet-based systems are configured for generating live broadcasts of media programs including audio content. In such systems, a creator may operate a mobile device, e.g., a smartphone or a tablet computer, or others, that is connected to one or more back-end systems for receiving audio data and transmitting the audio data to one or more devices of listeners. Enabling live broadcasts by such creators permits audio content that is timely, relevant and authentic to be generated and transmitted to the masses in real time or near-real time.

Currently, and for various reasons, a live broadcast originating from a mobile device often does not have the same level of quality as a live broadcast that originates from a traditional studio. For example, a live broadcast of a media program may be conducted in an active environment with substantial or varying ambient noise, unlike a traditional studio. Likewise, a live broadcast of a media program may be conducted using a handheld mobile device, such as a smartphone or a tablet computer, that includes microphones or other sensors that are typically located at varying distances from a mouth of the individual, thereby causing audio data captured by such microphones or other sensors to have varying levels of intensities or other qualities.

DETAILED DESCRIPTION

As is set forth in greater detail below, the present disclosure is directed to systems and methods for predicting levels of amplification for live broadcasts originating from personal devices, e.g., mobile devices such as smartphones or tablet computers, or others. In some implementations, when audio data generated by a creator, a host, a guest, or another participant in a media program is captured by a personal device, the audio data is amplified according to a predetermined or initial gain factor, and subjected to clipping or further processing, and a level of distortion of the audio data may be determined. Subsequently, when audio data generated by the participant is captured by the personal device, a gain factor for amplifying the audio data may be predicted in order to cause the audio data to have a level of distortion that is within a predetermined range or otherwise at an acceptable level, based on a previous gain factor and a previously observed level of distortion.

Figure 1A:
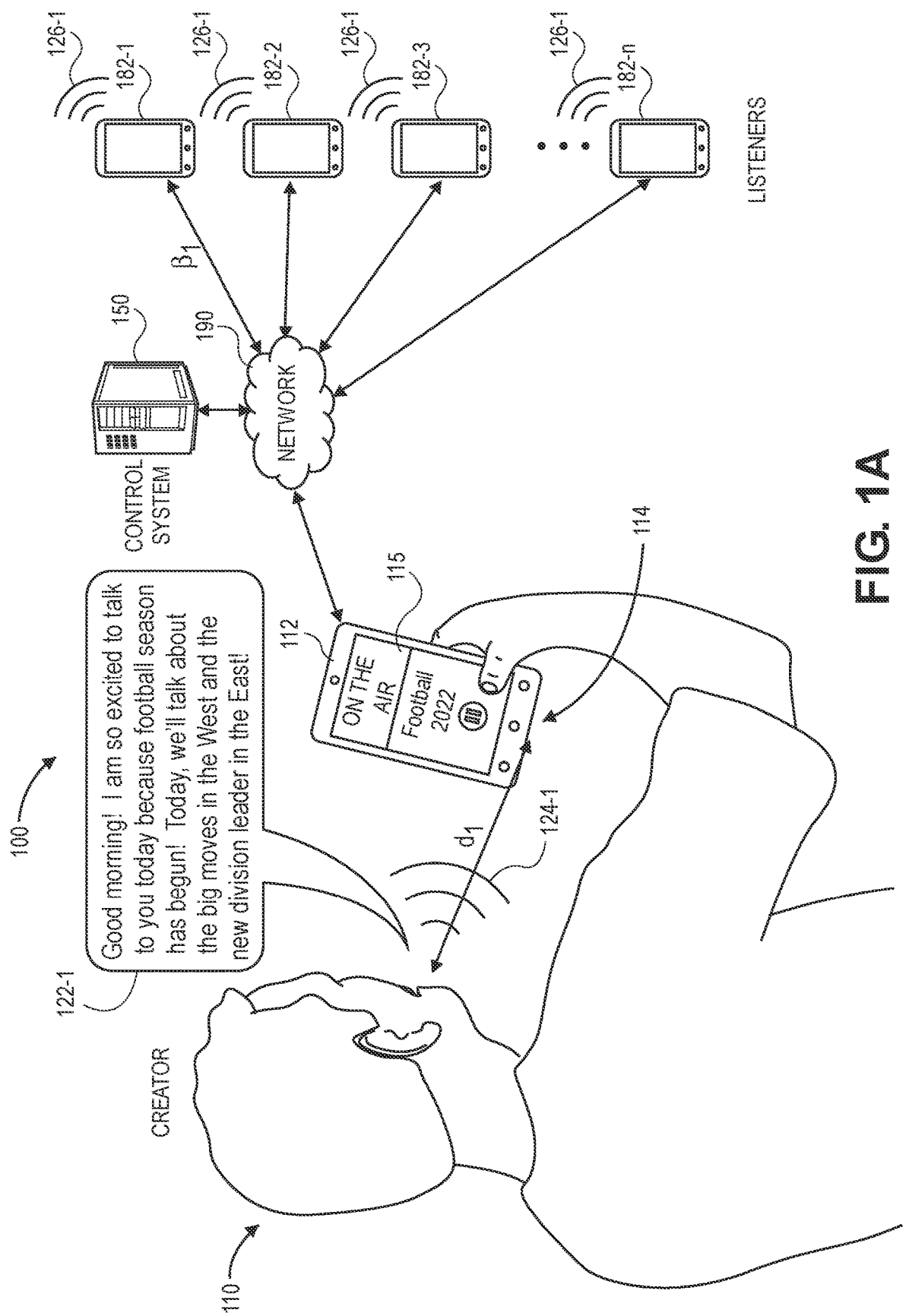
FIGS. 1A through 1F are views of aspects of one system in accordance with embodiments of the present disclosure.

Referring to FIGS. 1A through 1F, views of aspects of one system 100 in accordance with embodiments of the present disclosure are shown. As is shown in FIG. 1A, a mobile device 112 (e.g., a smartphone, a tablet computer, a laptop computer, or any other personal device) of a creator 110 (e.g., a user) is connected to a control system 150 (e.g., one or more servers or other computer systems), and a plurality of devices 182-1, 182-2, 182-3 . . . 182-n or other systems of any number n of listeners are connected to a network 190 (or one or more networks), which may include the Internet in whole or in part.

The devices 182-1, 182-2, 182-3 . . . 182-n may be of any type or form, including but not limited to mobile devices (e.g., smartphones, tablets or others), smart speakers, media players, computers (e.g., laptop or desktop computers), wrist watches, earphones or headphones, media streaming devices, or others.

The mobile device 112 includes a user interface rendered on a display 115 of the mobile device 112. The user interface includes information identifying a media program, viz., "Football 2022," and includes one or more controls for initiating, pausing or terminating the capture and transmission of media content, e.g., audio data, by the mobile device 112, or the transmission of the media content by the mobile device 112 to the control system 150 over the network 190. In some implementations, the display 115 may be a capacitive touchscreen, a resistive touchscreen, or any other system for receiving interactions by the creator 110.

Alternatively, or additionally, the creator 110 may interact with the user interface or the mobile device 112 in any other manner, such as by way of any input/output ("I/O") devices, including but not limited to a mouse, a stylus, a touchscreen, a keyboard, a trackball, or a trackpad, as well as any voice-controlled devices or software (e.g., a personal assistant), which may capture and interpret voice commands using one or more microphones or acoustic sensors provided on the mobile device 112 or any other systems (not shown). In accordance with implementations of the present disclosure, a user interface may include any number of buttons, text boxes, checkboxes, drop-down menus, list boxes, toggles, pickers, search fields, tags, sliders, icons, carousels, or any other interactive or selectable elements or features, for receiving information or data of any type or form. Moreover, in some implementations, the user interface may include one or more features enabling the creator 110 to select one or more media entities (e.g., songs, podcasts, or other media entities such as news programs, sports programs, weather reports or others), which may be live or previously recorded, to air in accordance with the media program.

In some implementations, the creator 110 may wear and use one or more ear buds (or earphones, or headphones) or other communication systems or devices which may be in communication with the mobile device 112, and may exchange (e.g., transfer or receive) data relating to audio signals or any other data with the mobile device 112 directly, or with the mobile device 112 or any other computer devices or systems over the network 190.

Additionally, the control system 150 may be programmed or configured to execute any number of operations associated with the presentation of media content to listeners associated with the devices 182-1, 182-2, 182-3 . . . 182-n. For example, in some implementations, the control system 150, or one or more other computer devices or systems, may initiate or establish one-way communications channels between the control system 150 or any other computer devices or systems and the devices 182-1, 182-2, 182-3 . . . 182-n. In some implementations, the control system 150, or one or more other computer devices or systems, may initiate or establish two-way communications channels between the control system 150 or any other computer devices or systems and the mobile device 112 of the creator 110, or devices or systems of any other participants (not shown in FIG. 1A) in one or more episodes of the media program. Alternatively, or additionally, the control system 150 or any other computer devices or systems may establish one-way or two-way communications channels with sources of media entities or other content (e.g., music, advertisements, news, or others).

As is also shown in FIG. 1A, the creator 110 provides an utterance 122-1 of one or more words that are intended to be heard by listeners to an episode of a media program using the devices 182-1, 182-2, 182-3 . . . 182-n. In particular, the utterance 122-1 includes the words "Good morning! I am so excited to talk to you today because football season has begun! Today, we'll talk about the big moves in the West and the new division leader in the East!" As is shown in FIG. 1A, the mobile device 112 includes a microphone 114 or another acoustic sensor that is provided at a distance $d_1$ from a mouth of the creator 110, within an operating range of the microphone 114. The mobile device 112 captures audio data (or acoustic data) 124-1 representing the utterance 122-1 of the creator 110, and transmits the data to the control system 150 over the network 190.

In some implementations, the mobile device 112 may have established a two-way communication channel, or a bidirectional channel, with the control system 150, enabling the mobile device 112 to transmit audio data to or receive audio data from the control system 150, or from any other systems. In some implementations, each of the devices 182-1, 182-2, 182-3 . . . 182-n may have established a one-way communication channel, or unidirectional channel, between the devices 182-1, 182-2, 182-3 . . . 182-n and the control system 150, or any other systems (e.g., a broadcast system), enabling the devices 182-1, 182-2, 182-3 . . . 182-n to receive audio data from the control system 150, or from any other systems.

Figure 1B:
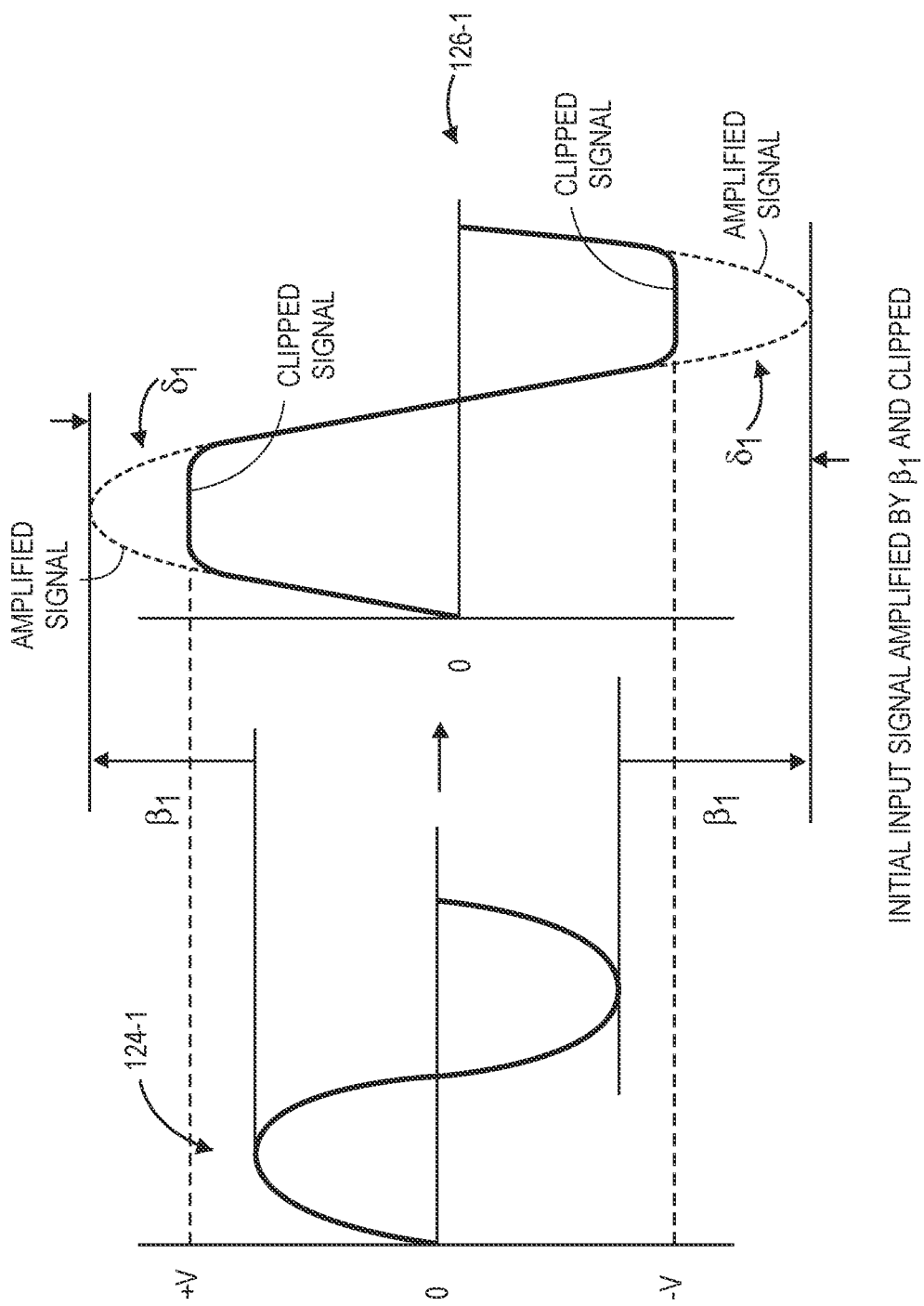

As is shown in FIG. 1A, the control system 150 may process some or all of the data 124-1 captured by the mobile device 112, and cause the processed data 126-1 to be transmitted to one or more computer systems or devices of listeners over the network 190, including but not limited to the devices 182-1, 182-2, 182-3 . . . 182-n. For example, as is shown in FIGS. 1A and 1B, the audio data 124-1 may be amplified by an initial gain factor $\beta_1$ that may be selected on any basis, and subjected to clipping or other processing to generate the audio data 126-1 that is transmitted to the devices 182-1, 182-2, 182-3 . . . 182-n. The clipping or other processing may result in an amount of distortion, or $\delta_1$, of the audio data 126-1, that is preferably within a target distortion range, viz., between a low distortion threshold $\delta_{LOW}$ and a high distortion threshold $\delta_{HIGH}$. The distortion $\delta_1$ may be calculated in any manner based on the signal of the audio data 124-1 as amplified, and the clipped signal of the audio data 126-1 in any manner. In some implementations, the distortion $\delta_1$ is calculated as a square root of a $\chi^2$ (or chi-squared) comparison score determined based on the amplified signal of the audio data 124-1 as compared to the clipped signal of the audio data 126-1, e.g., following a clipping of the amplified signal, scaled to a duration of a signal used for measurement.

For example, in some implementations, distortion may result from subjecting audio data to "hard" clipping, such as where a value of an amplified signal of the audio data 124-1 is strictly limited to a maximum amplitude V', e.g., by removing positive or negative peaks of the audio signal beyond the maximum amplitude, thereby ensuring that the audio data 126-1 transmitted to and played by the devices 182-1, 182-2, 182-3 . . . 182-n of listeners remains within an allowable dynamic range. In some implementations, distortion may result from subjecting audio data to "soft" clipping, such as where smoothed transitions (or rounding) are applied between unclipped portions of an amplified signal of the audio data 124-1 and clipped portions of the audio data 126-1. An audio signal that results from soft clipping has a distortion effect by which the signal is limited to a maximum amplitude but is saturated, e.g., smoothly curved, rather than having one or more abrupt breaks corresponding to the maximum amplitude. The hard clipping or the soft clipping may occur according to any algorithm or formula in accordance with implementations of the present disclosure.

In accordance with implementations of the present disclosure, a gain factor for amplifying audio data may be selected with a goal of maintaining distortion of subsequent audio data within a target distortion range, such that distortions resulting from amplification of audio data are preferably maintained between target distortion thresholds $\delta_{LOW}$ and $\delta_{HIGH}$. For example, in some implementations, distortions of audio data representing spoken or sung words may preferably be maintained between a low distortion threshold $\delta_{LOW}$ of approximately 0.7% and a high distortion threshold $\delta_{HIGH}$ of approximately 1.7%.

Figure 1C:
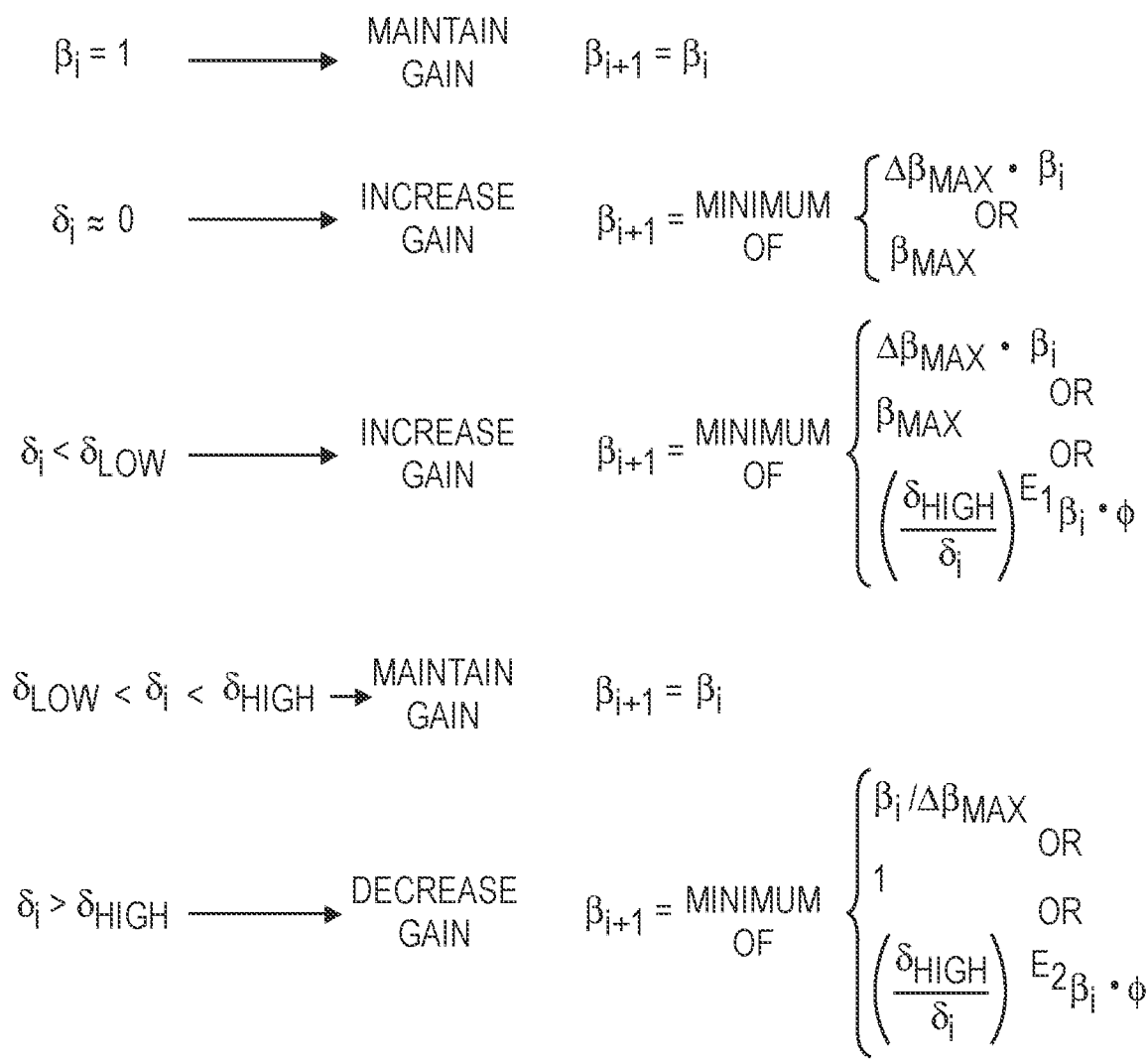

As is shown in FIG. 1C, a next gain factor $\beta_{i+1}$ may be selected according to one or more algorithms or formulas based on a prior gain factor $\beta_i$ and a level of distortion $\delta_i$ that was previously observed when audio data was amplified according to the prior gain factor $\beta_i$. Such algorithms or formulas may be used to predict a gain factor, or an extent of additional amplification, that may be applied to audio data before distortion observed in the amplified audio data is undesired, unacceptable, or otherwise beyond a target distortion range or threshold.

For example, as is shown in FIG. 1C, where a gain factor $\beta_i$ is equal to one, or is a unity factor, such that the audio data is not amplified, or where audio data transmitted to the listener devices has a same level of intensity as audio data captured from a personal device of a participant in a live broadcast, distortion in the audio data is likely already comparatively high, and no change in a level of amplification is necessary. Thus, the gain factor $\beta_{i+1}$ may be maintained equal to the gain factor $\beta_i$, or one.

Where a level of distortion $\delta_i$ observed following amplification of the audio data by the gain factor $\beta_i$ is approximately zero, however, the gain factor $\beta_{i+1}$ may be determined by increasing the gain factor $\beta_i$ by a maximum amount or factor, subject to a predetermined maximum rate of change, or $\Delta\beta_{MAX}$. For example, in some implementations, where the level of distortion $\delta_i$ is approximately zero, the gain factor $\beta_{i+1}$ may be determined by doubling the gain factor $\beta_i$ (or multiplying the gain factor $\beta_i$ by any factor other than two). Alternatively, the gain factor $\beta_{i+1}$ may be set equal to a maximum gain factor $\beta_{MAX}$, whichever is lower. The maximum gain factor $\beta_{MAX}$ may be defined to ensure that audio data subsequently captured from the creator 110 is not amplified to an unacceptably large extent. For example, where a large gain factor is calculated based on relatively quiet audio data including sufficiently loud background noise that is mistakenly identified as including spoken or sung words or other meaningful content, and audio data including spoken or sung words is subsequently captured, multiplying that audio data by the large gain factor could result in heavy distortion. Limiting the gain factor $\beta_{i+1}$ to the maximum gain factor $\beta_{MAX}$ may, therefore, ensure that spoken or sung words following extended periods of relatively quiet sounds remain intelligible to listeners following amplification by the gain factor $\beta_{i+1}$.

Where a level of distortion $\delta_i$ observed following amplification of the audio data by the gain factor $\beta_i$ is greater than zero, but is less than the low threshold $\delta_{LOW}$ of the target distortion range, a gain factor $\beta_{i+1}$ that will enable an amplification of audio while maintaining distortion within the target distortion range may be determined by multiplying the gain factor $\beta_i$ by a plurality of factors. For example, as is shown in FIG. 1C, the gain factor $\beta_{i+1}$ may be calculated as a minimum of one of a product of the maximum rate of change $\Delta\beta_{MAX}$ and the gain factor $\beta_i$, as the maximum gain factor $\beta_{MAX}$, or as a product of a quotient of the high threshold $\delta_{HIGH}$ divided by the level of distortion $\delta_i$, to an exponent $E_1$, by the gain factor $\beta_i$ and a gain factor overhead $\phi$.

The exponent $E_1$ may be selected or set to result in an acceptable distortion ratio, which may be determined as a function of an order of polynomial of a clipping formula. For example, in some implementations, where the level of distortion $\delta_i$ is below the low threshold $\delta_{LOW}$, and where the audio data 124-1 is clipped according to a fifth-order polynomial equation, a value of the exponent $E_1$ by which the quotient of the high threshold $\delta_{HIGH}$ and the level of distortion $\delta_i$ may be multiplied to result in distortion within the target distortion range between the low threshold $\delta_{LOW}$ and the high threshold $\delta_{HIGH}$ may be assumed to be approximately 0.233. In some implementations, the exponent $E_1$ may be calculated by amplifying a representative set of non-live (or previously recorded) audio data representing spoken or sung words by a gain factor $\beta$, and measuring a distortion $\delta$ resulting therefrom due to clipping. The gain factor $\beta$ may be adjusted until the measured distortion $\delta$ is approximately one-half a value of the low threshold $\delta_{LOW}$. The same set of non-live audio data may be iteratively amplified by one or more slightly higher gain factors $\beta'$, and distortions $\delta'$ resulting therefrom due to clipping may be measured. A value of the exponent $E_1$ may be calculated as a base $(\delta'/\delta)$ logarithm of $(\beta'/\beta)$. Alternatively, a value of the exponent $E_1$ may be selected on any other basis.

The gain factor overhead $\phi$ may be selected on any basis. In some implementations, the gain factor overhead $\phi$ may correspond to a reduction of amplification by one decibel (or $-1$ dB), which corresponds to an amplitude factor of approximately 0.89125.

Where the level of distortion $\delta_i$ is within the target distortion range, or where the level of distortion $\delta_i$ is between the low threshold $\delta_{LOW}$ and the high threshold $\delta_{HIGH}$, no change in an amount of amplification is necessary, and the gain factor $\beta_{i+1}$ may be maintained equal to the gain factor $\beta_i$, or one.

Where the level of distortion $\delta_i$ is greater than the high threshold $\delta_{HIGH}$, or is above the target distortion range, a gain factor $\beta_{i+1}$ that will enable an amplification of audio but return distortion to the target distortion range may be determined by multiplying the gain factor $\beta_i$ by a plurality of factors. For example, as is shown in FIG. 1C, the gain factor $\beta_{i+1}$ may be calculated as a maximum of one of a quotient of the gain factor $\beta_i$ and the maximum, a value of one, or a product of the quotient of the high threshold $\delta_{HIGH}$ divided by the level of distortion $\delta$, to an exponent $E_2$, by the gain factor $\beta_i$ and the gain factor overhead $\phi$. Like the exponent $E_1$, the exponent $E_2$ may be selected or set to result in an acceptable distortion ratio, which may be determined as a function of an order of polynomial of a clipping formula. For example, where the level of distortion $\delta_i$ is above the high threshold $\delta_{HIGH}$, and where the audio data 124-1 is clipped according to a fifth-order polynomial equation, a value of the exponent $E_2$ by which the quotient of the high threshold $\delta_{HIGH}$ and the level of distortion $\delta_i$ may be multiplied to result in distortion within the target distortion range, viz., between the low threshold $\delta_{LOW}$ and the high threshold $\delta_{HIGH}$, may be assumed to be approximately 0.296. In some implementations, the exponent $E_2$ may be calculated by amplifying a representative set of non-live (or previously recorded) audio data representing spoken or sung words by a gain factor $\beta$, and measuring a distortion $\delta$ resulting therefrom due to clipping. The gain factor $\beta$ may be adjusted until the measured distortion $\delta$ is approximately twice a value of a high threshold $\delta_{HIGH}$. The same set of non-live audio data may be iteratively amplified by one or more slightly higher gain factors $\beta'$, and distortions $\delta'$ resulting therefrom due to clipping may be measured. A value of the exponent $E_2$ may be calculated as a base $(\delta'/\delta)$ logarithm of $(\beta'/\beta)$. Alternatively, another value of the exponent $E_2$ may be selected on any other basis.

Figure 1D:
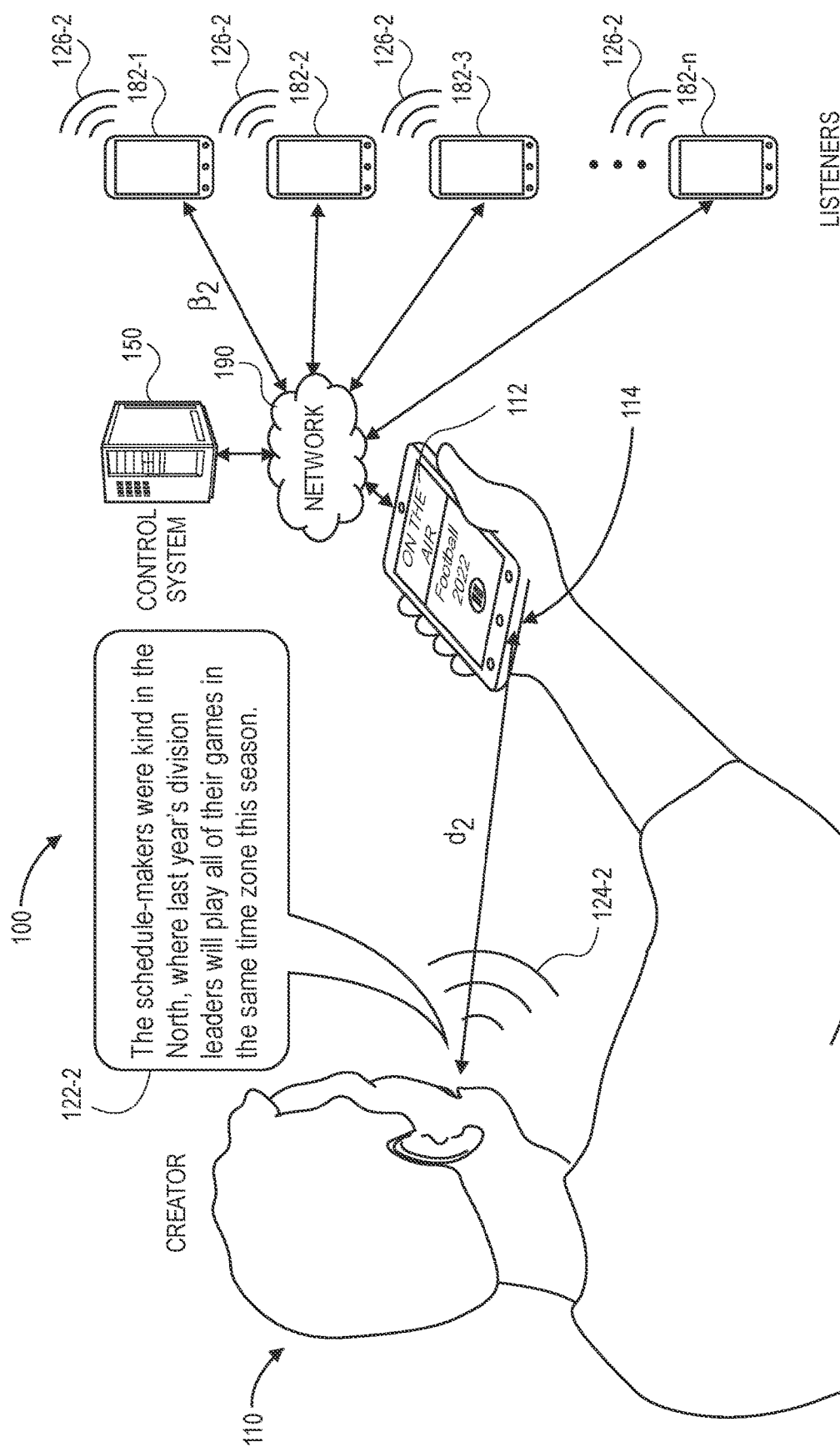

A gain factor selected in accordance with implementations of the present disclosure may be utilized to amplify audio data captured from a creator or another participant in a media program, in an effort to optimize amplification of the audio data while increasing a likelihood that distortion will remain within the target distortion range. As is shown in FIG. 1D, the creator 110 provides an additional utterance 122-2 of one or more words that are intended to be heard by the listeners using the devices 182-1, 182-2, 182-3 ... 182-$n$. In particular, the utterance 122-2 includes the words "The schedule-makers were kind in the North, where last year's division leaders will play all of their games in the same time zone this season." The microphone 114 of the mobile device 112 is provided at a distance $d_2$ from a mouth of the creator 110, within an operating range of the microphone 114, when the utterance 122-2 is made. The distance $d_2$ shown in FIG. 1D is substantially greater than the distance $d_1$ shown in FIG. 1A.

The mobile device 112 captures audio data (or acoustic data) 124-2 representing the utterance 122-2 of the creator 110, and transmits the data to the control system 150 over the network 190. Because the distance $d_2$ is substantially greater than the distance $d_1$, the audio data 124-2 has a substantially lower volume level than the audio data 124-1. The control system 150 (or another system) may process the audio data 124-2, as necessary, to generate audio data 126-2, and transmit the audio data 126-2 to the devices 182-1, 182-2, 182-3 . . . 182-$n$ of the listeners.

A volume level of the utterance 122-2 may be sensed, and distortion of the utterance 122-2 may be measured, in real time or near-real time. For example, within a brief period, such as one to two seconds, the audio data 126-2 may be generated by amplifying the audio data 124-2 by a gain factor $\beta_2$ selected in accordance with implementations of the present disclosure. Because a volume level of the audio data 124-2 is lower than a volume level of the audio data 124-1, and effects of clipping are correspondingly diminished, a level of distortion $\delta_2$ may be lower than the threshold $\delta_{LOW}$. Therefore, a new and greater gain factor $\beta_2$ may be calculated by multiplying the gain factor $\beta_i$ by a quotient of the high threshold $\delta_{HIGH}$ divided by the level of distortion $\delta_2$, to the exponent $E_1$, and the gain factor overhead $\phi$. When the gain factor $\beta_2$ is applied to audio data subsequently captured by the mobile device 112, the audio data is expected to have a level of distortion that is within the target distortion range.

Figure 1E:
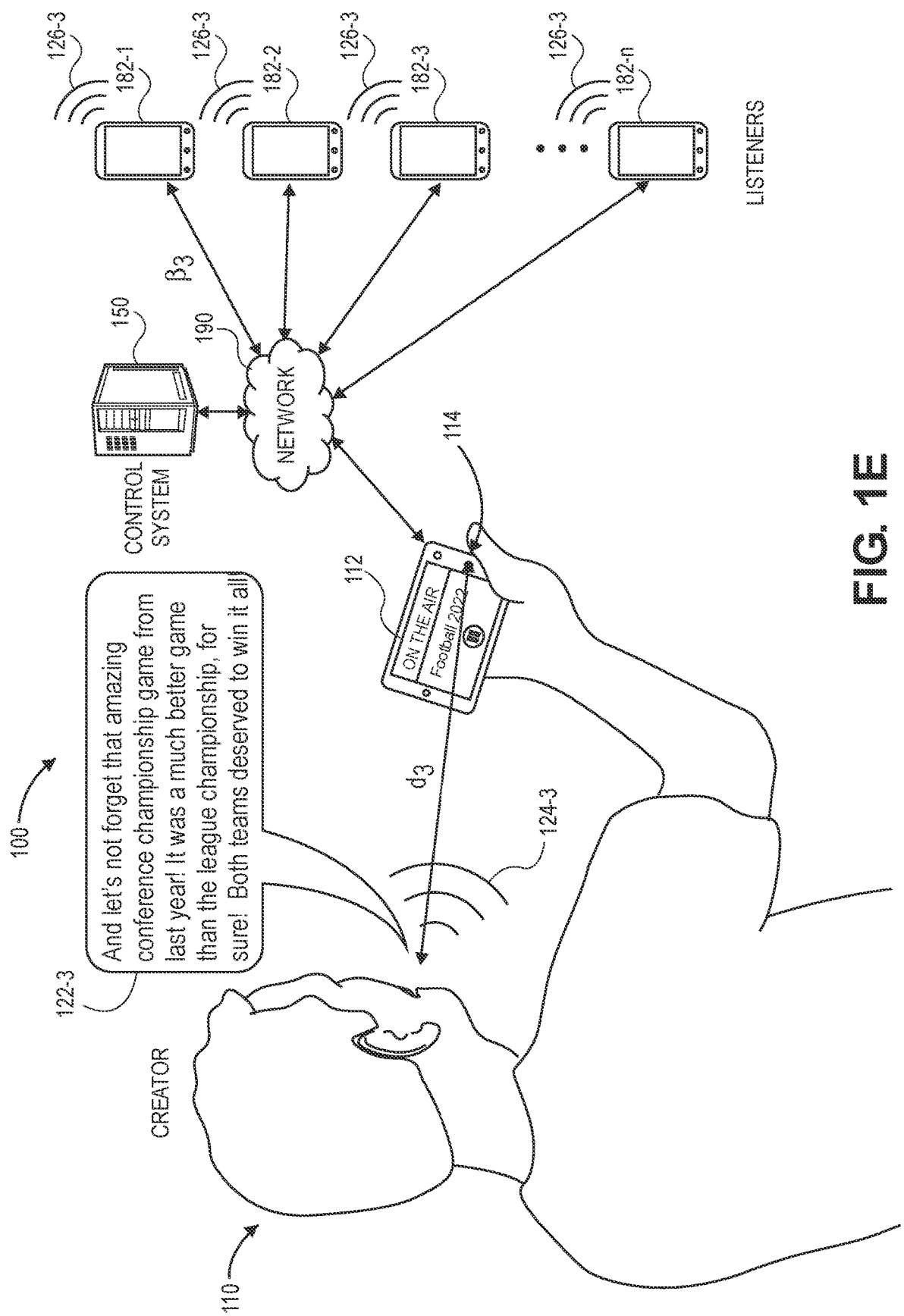

As is shown in FIG. 1E, the creator 110 provides an additional utterance 122-3 of one or more words that are intended to be heard by the listeners using the devices 182-1, 182-2, 182-3 . . . 182-$n$. In particular, the utterance 122-3 includes the words "And let's not forget that amazing conference championship game from last year! It was a much better game than the league championship, for sure! Both teams deserved to win it all!" The microphone 114 of the mobile device 112 is provided at a distance $d_3$ from a mouth of the creator 110, within an operating range of the microphone 114, when the utterance 122-3 is made. The distance $d_3$ shown in FIG. 1E is approximately the same as the distance $d_2$ shown in FIG. 1D.

The mobile device 112 captures audio data (or acoustic data) 124-3 representing the utterance 122-3 of the creator 110, and transmits the data to the control system 150 over the network 190. Because the distance $d_3$ is substantially equal to the distance $d_2$, the audio data 124-3 may have a volume level that is substantially equal to a volume level of the audio data 124-2. The control system 150 (or another system) may process the audio data 124-3, as necessary, to generate audio data 126-3, and transmit the audio data 126-3 to the devices 182-1, 182-2, 182-3 . . . 182-$n$ of the listeners.

The audio data 126-3 may be generated by amplifying the audio data 124-3 by a gain factor $\beta_3$ selected in accordance with implementations of the present disclosure. For example, if the level of distortion $\delta_2$ of the audio data 126-2 is within the target distortion range, the gain factor $\beta_3$ may be set equal to the gain factor $\beta_2$. When the gain factor $\beta_3$ is applied to the audio data 124-3, the audio data 126-3 is anticipated to have a level of distortion that is within the target distortion range.

Figure 1F:
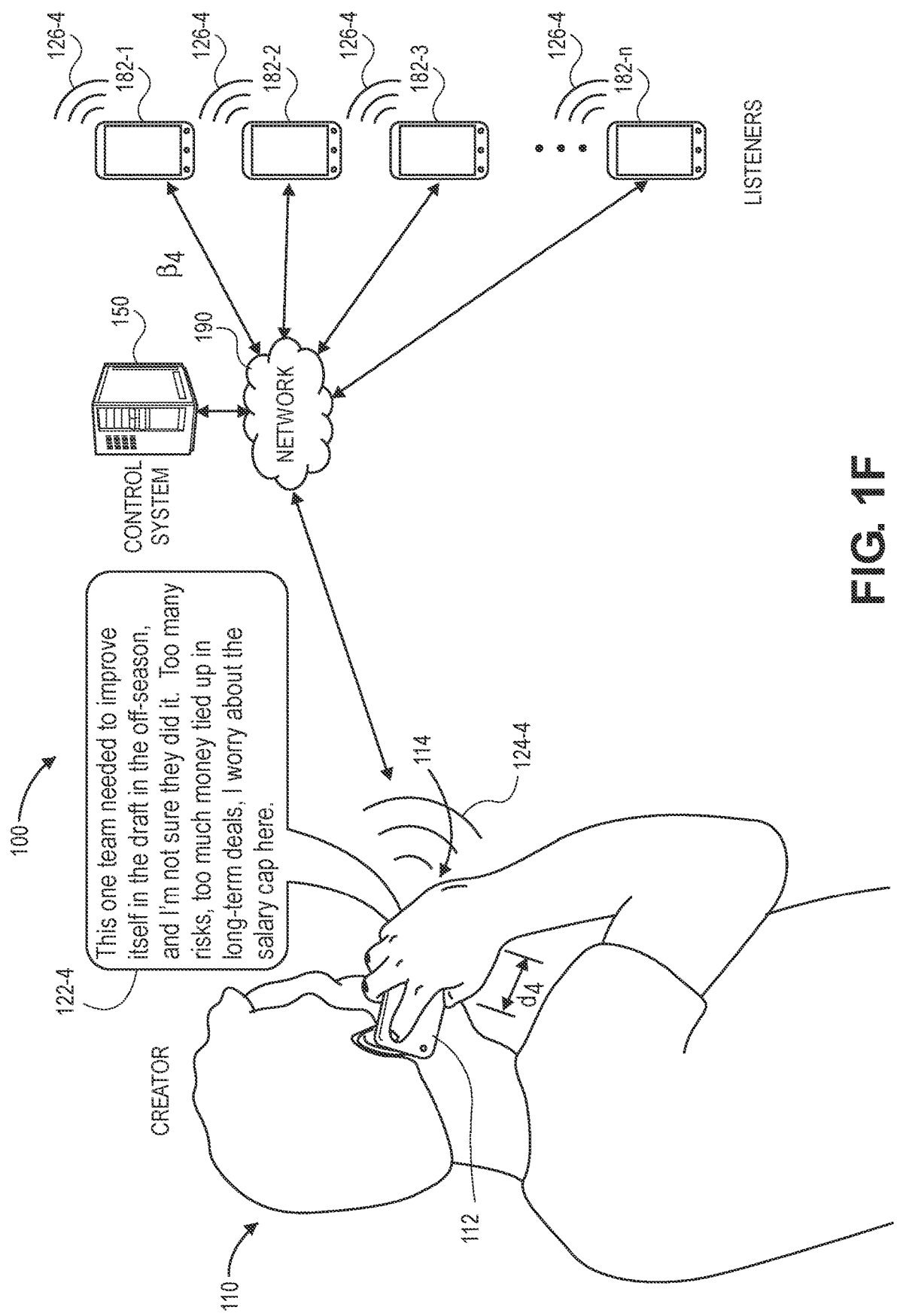

Finally, as is shown in FIG. 1F, the creator 110 provides an additional utterance 122-4 of one or more words that are intended to be heard by the listeners using the devices 182-1, 182-2, 182-3 . . . 182-$n$. In particular, the utterance 122-4 includes the words "This one team needed to improve itself in the draft in the off-season, and I'm not sure they did it. Too many risks, too much money tied up in long-term deals, I worry about the salary cap here." The microphone 114 of the mobile device 112 is provided at a distance $d_4$ from a mouth of the creator 110, within an operating range of the microphone 114, when the utterance 122-4 is made. The distance $d_4$ shown in FIG. 1F is smaller than the distance $d_1$ shown in FIG. 1A, or the distances $d_2$, $d_3$ shown in FIGS. 1D and 1E.

The mobile device 112 captures audio data (or acoustic data) 124-4 representing the utterance 122-4 of the creator 110, and transmits the data to the control system 150 over the network 190. Because the distance $d_4$ is smaller than any of the distances $d_1$, $d_2$, $d_3$, the audio data 124-4 may have a volume level that is substantially greater than a volume level of any of the audio data 124-1, 124-2, 124-3. The control system 150 (or another system) may process the audio data 124-4, as necessary, to generate audio data 126-4, and transmit the audio data 126-4 to the devices 182-1, 182-2, 182-3 . . . 182-$n$ of the listeners.

The audio data 126-4 may be generated by amplifying the audio data 124-4 by a gain factor $\beta_4$ selected in accordance with implementations of the present disclosure. For example, if the level of distortion $\delta_4$ is above the target distortion range, the gain factor $\beta_4$ may be determined by multiplying the gain factor $\beta_3$ by the quotient of the high threshold $\delta_{HIGH}$ divided by the level of distortion $\delta_3$, to the exponent $E_2$, and the gain factor overhead $\phi$.

Accordingly, the systems and methods of the present disclosure may be used to select or predict a gain factor for amplifying audio data captured during a live broadcast of a media program, e.g., by a personal device (or a mobile device) of a creator, a host, or another participant in the media program. Where the audio data is to be amplified prior to transmission to devices of one or more listeners, a gain factor predicted in accordance with the present disclosure may be used to increase a likelihood that distortion will remain within an acceptable range, e.g., the target distortion range. As a creator moves closer to or farther from a microphone or other acoustic sensor of a personal device, or raises or lowers his or her volume of speech, a gain factor is repeatedly calculated and recalculated in order to increase a likelihood that distortion of audio data remains within a target distortion range, e.g., above a low distortion threshold and below a high distortion threshold.

In some implementations, when a live broadcast of a media program begins, audio data captured from personal devices of a creator or any other participants may be processed to determine how much the audio data may be amplified while maintaining distortion within a targeted distortion range.

Audio data may be encoded as a set of numeric values representing sound waves, or changes in air pressure over time. Such values may have predefined ranges of maximum or minimum values, and may be represented in a raw or normalized fashion. To amplify the audio data, a gain factor having a value greater than one may be applied to each of such values.

Because amplification may cause some of the values of the audio data to exceed maximum or minimum values of a predefined range, such values may be processed, e.g., by clipping, to return the values to the predefined range. Clipping, which may be "hard" or "soft," causes distortion of the signal, depending on a value of the gain factor applied.

In a non-live media program, such as a podcast, audio data captured from participants in the media program may be iteratively processed by applying various different gain factors to the audio data, until a maximum gain factor that maintains audio data at an acceptable level of distortion is identified. In a live broadcast of a media program, however, clipping audio data creates a paradox for producers of the media program: the use of a single gain factor that is too high may cause unwanted distortions, while a single gain factor that is too low may leave out the opportunity to further amplify the audio data for listeners.

The systems and methods of the present disclosure may include a conference system (or module) that enables a creator of a media program and any participants in the media program to engage in conversation, which may be transmitted to devices of any number of listeners via a broadcast system (or module) to which each of such devices of listeners may be connected. Such systems and methods may also include a media source (e.g., a music source) that operates in parallel to the conference system, and transmits content from one or more selected media entities to devices of listeners or any other devices or systems, and buffers (or pre-buffers) the selected media entities at such points. The media source may further cause any other media content to be transmitted to devices of listeners to a media program at any other time and in any other manner in accordance with implementations of the present disclosure.

The systems and methods of the present disclosure may also include a synchronization system (or module) that receives, detects or interprets instructions or commands executed or otherwise made by a creator of a media program regarding the playing of media content, and likewise instructs or commands each of the devices of listeners to mix or deliver media content in accordance with the instructions or commands of the creator. The synchronization system may be or act as a state manager system (or module) that determines and maintains a record of a state of a media program. Devices of listeners who intend to join a media program in progress may be synchronized with the media program based on a state determined or maintained by the state manager system. Instructions or commands received from a creator may be determined and transmitted by the synchronization system to devices of listeners in accordance with a state of the media program.

Media content that may be included in a media program includes, but need not be limited to, one or more songs or other music files from a music catalog, repository or streaming service, one or more advertisements of items, goods or services, or one or more news, sports or weather programs, which may be live or previously recorded, as well as voices of a creator or one or more guests, such as musicians, celebrities, personalities, athletes, politicians, or artists, or any listeners to the media program. A control system, or any associated conference systems, broadcast systems or mixing systems, may establish or terminate connections with a creator, with any sources of media content, or with any number of listeners, to compile and efficiently transmit the media program over digital channels (e.g., web-based or application-based), to any number of systems or devices of any form.

The various aspects of the present disclosure described herein, e.g., the devices of creators, participants or listeners, as well as the conference systems, the broadcast systems, the media systems, the synchronization systems or the state management systems may be embodied directly in hardware components, in software modules stored on one or more memory components and executed by one or more processors, or in a combination of hardware components and software modules in accordance with implementations of the present disclosure.

One or more of the embodiments disclosed herein may overcome limitations of existing systems and methods for presenting media programs or other content, e.g., radio programs, to listeners. Unbounded by traditional frequency bands or broadcast protocols, the systems and methods of the present disclosure may receive designations of media content from a creator of a media program, e.g., in a broadcast plan, and the media program may be transmitted over one or more networks to any number of listeners in any locations and by way of any devices. Creators of media programs may designate one or more types or files of media content to be broadcast to listeners via a user interface rendered on a display or by any type or form of computer device, in accordance with a broadcast plan or other schedule. A control system, or a mixing system, a conference system or a broadcast system, may retrieve the designated media content from any number of sources, or initiate or control the designated media content to any number of listeners, by opening one or more connections between computer devices or systems of the creator and computer devices or systems of the sources or listeners.

In some implementations of the present disclosure, one-way communication channels, or unidirectional channels, may be established between a broadcast system (or a control system) and any number of other computer devices or systems. For example, broadcast channels may be established between a broadcast system (or a control system) and sources of media or other content, or between a broadcast system (or a control system) and devices of any number of listeners, for providing media content. Two-way communication channels, or bidirectional channels, may also be established between a conference system (or a control system) and any number of other computer devices or systems. For example, a conference channel may be established between a computer device or system of a creator or another source of media and a conference system (or a control system). Furthermore, one-way or two-way communication channels may be established between a conference system and a mixing system, or between a mixing system and a broadcast system, as appropriate.

Communication channels may be established in any manner, in accordance with implementations of the present disclosure. Those of ordinary skill in the pertinent arts will recognize that computer networks, such as the Internet, may operate based on a series of protocols that are layered on top of one another. Such protocols may be collectively referred to as an Internet Protocol suite (or IP suite). One underlying layer of the IP suite is sometimes referred to in the abstract as a link layer, e.g., physical infrastructure, or wired or wireless connections between one or more networked computers or hosts. A second layer atop the link layer is a network layer, which is sometimes called an Internet Protocol layer, and is a means by which data is routed and delivered between two disparate physical locations.

A third layer in an IP suite is a transport layer, which may be analogized to a recipient's mailbox. The transport layer may divide a host's network interface into one or more channels, or ports, with each host having as many ports available for establishing simultaneous network connections. A socket is a combination of an IP address describing a host for which data is intended and a port number indicating a channel on the host to which data is directed. A socket is used by applications running on a host to listen for incoming data and send outgoing data. One standard transport layer protocol is the Transmission Control Protocol, or TCP, which is full-duplex, such that connected hosts can concurrently send and receive data. A fourth and uppermost layer in the IP suite is referred to as an application layer. Within the application layer, familiar protocols such as Hypertext Transfer Protocol (or "HTTP"), are found. HTTP is built on a request/response model in which a client sends a request to a server, which may be listening for such requests, and the server parses the request and issues an appropriate response, which may contain a network resource.

One application-layer protocol for communicating between servers and clients is called WebSocket, which provides TCP-like functionality at the application layer. Like TCP, WebSocket is full-duplex, such that once an underlying connection is established, a server may, of its own volition, push data to client devices with which the server is connected, and clients may continue to send messages to the server over the same channel. Additionally, a pure server-push technology is also built into HTML5, one version of Hypertext Markup Language. This technology, which is known as Server-Sent Events (or SSE), operates over standard HTTP, and is a novel use of an existing application-layer protocol. Server-Sent Events works by essentially sending partial responses to an initial HTTP request, such that a connection remains open, enabling further data to be sent at a later time. In view of its unidirectional nature, Server-Sent Events is useful in situations in which a server will be generating a steady stream of updates without requiring anything further from a client.

Communications channels of the present disclosure may be associated with any type of content and established computer devices and systems associated with any type of entity, and in accordance with a broadcast plan or sequence of media content, or at the control or discretion of one or more creators. One or more user interfaces rendered by or on a computer system or device may permit a creator to control the synchronization or mixing of media content by the broadcast system or the mixing system. Gestures or other interactions with the user interfaces may be translated into commands to be processed by the broadcast system or the mixing system, e.g., to play a specific media entity, to insert a specific advertisement, or to take any other relevant actions, such as to adjust a volume or another attribute or parameter of media content. Moreover, a broadcast system or the mixing system may provide any relevant information to a creator via such user interfaces, including information regarding attributes or parameters of media content that was previously played, that is being played, or that is scheduled to be played in accordance with a broadcast plan or during a media program. The broadcast system or the mixing system may further execute one or more instructions in response to rules, which may define or control media content that is to be played at select times during a media program, e.g., to automatically increase or decrease volumes or other attributes or parameters of a voice of a creator, or of other media content from other sources, on any basis. Any rules governing the playing of media content of a media program by the broadcast system or the mixing system may be overridden by a creator, e.g., by one or more gestures or other interactions with a user interface of an application in communication with the broadcast system or the mixing system that may be associated with the playing of the media content or the media program.

Figure 2A:
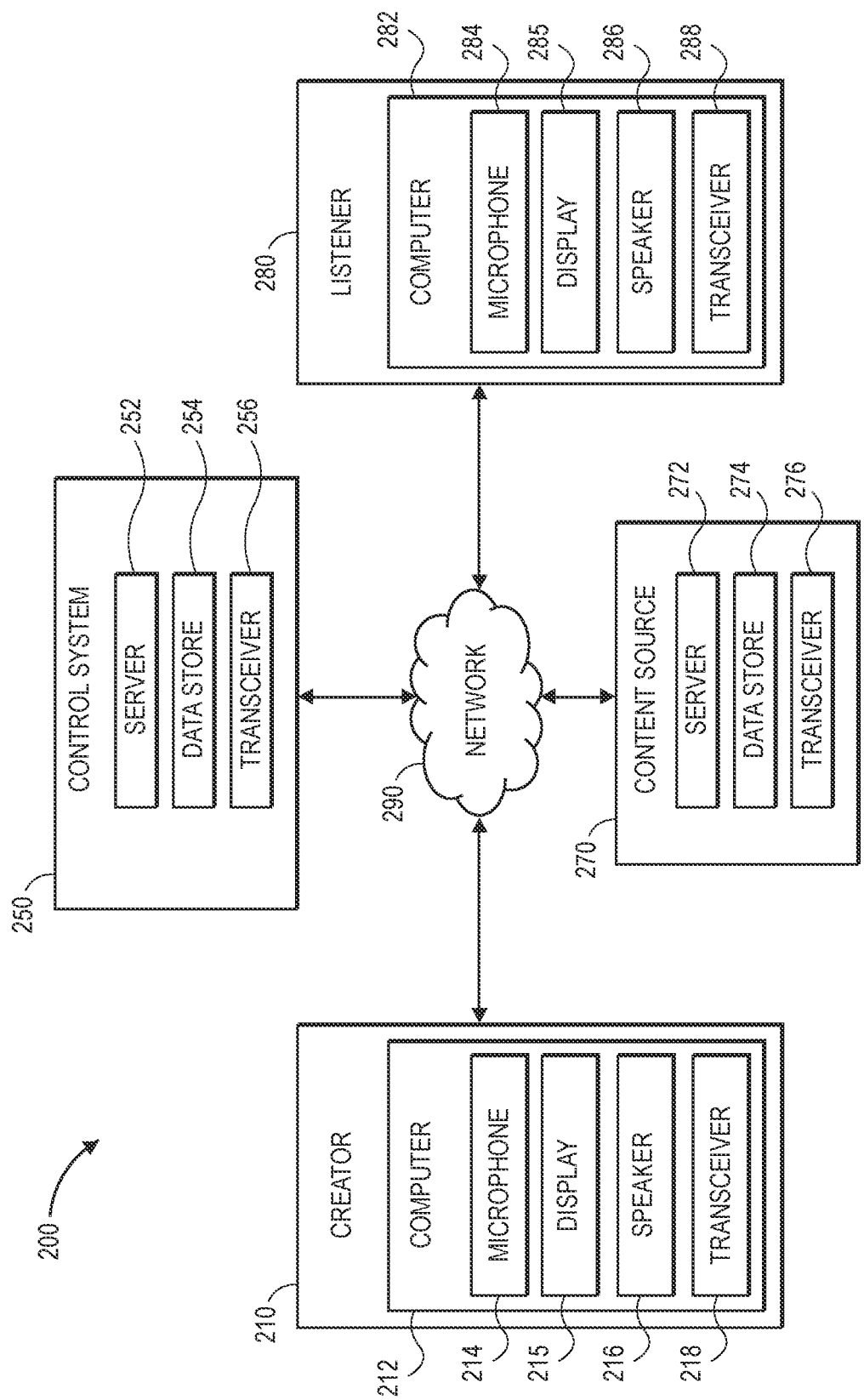
FIGS. 2A through 2C are block diagrams of components of one system in accordance with embodiments of the present disclosure.
Figure 2B:
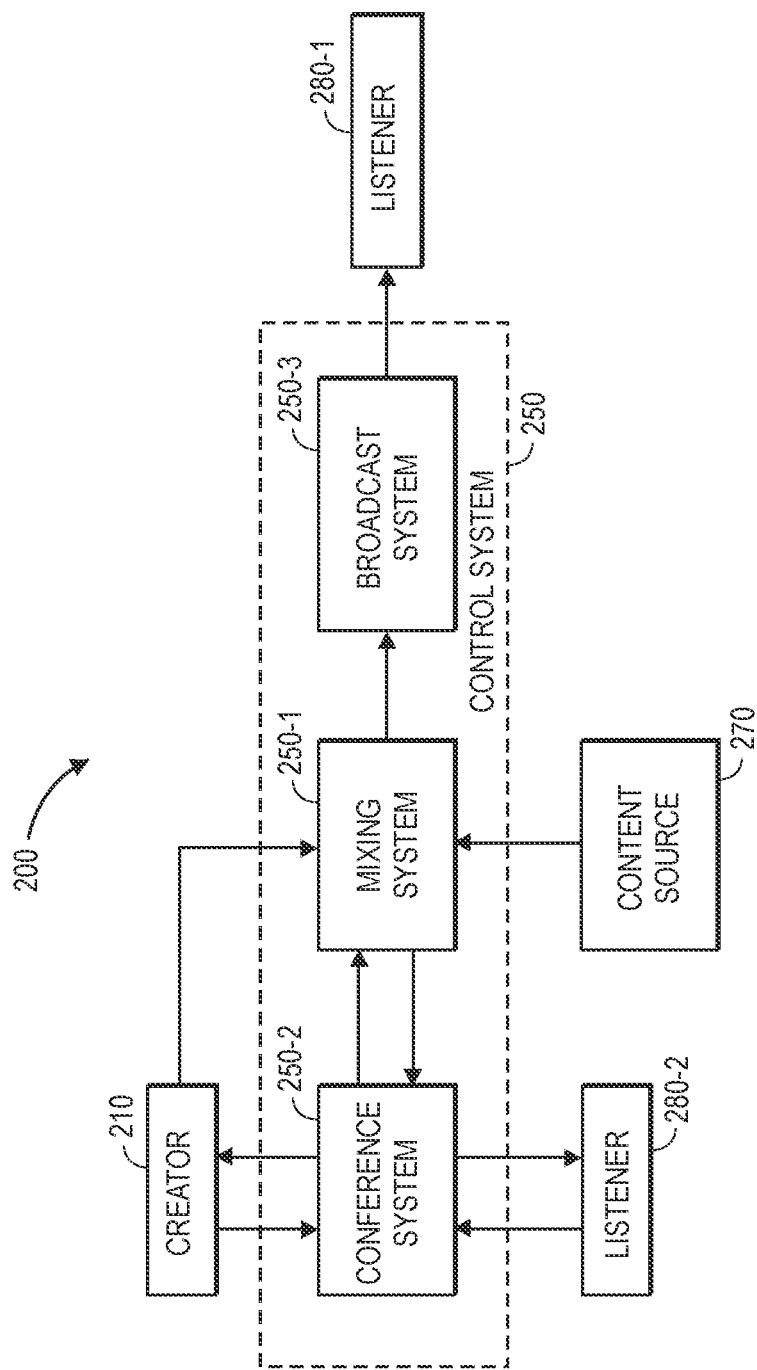
Figure 2C:
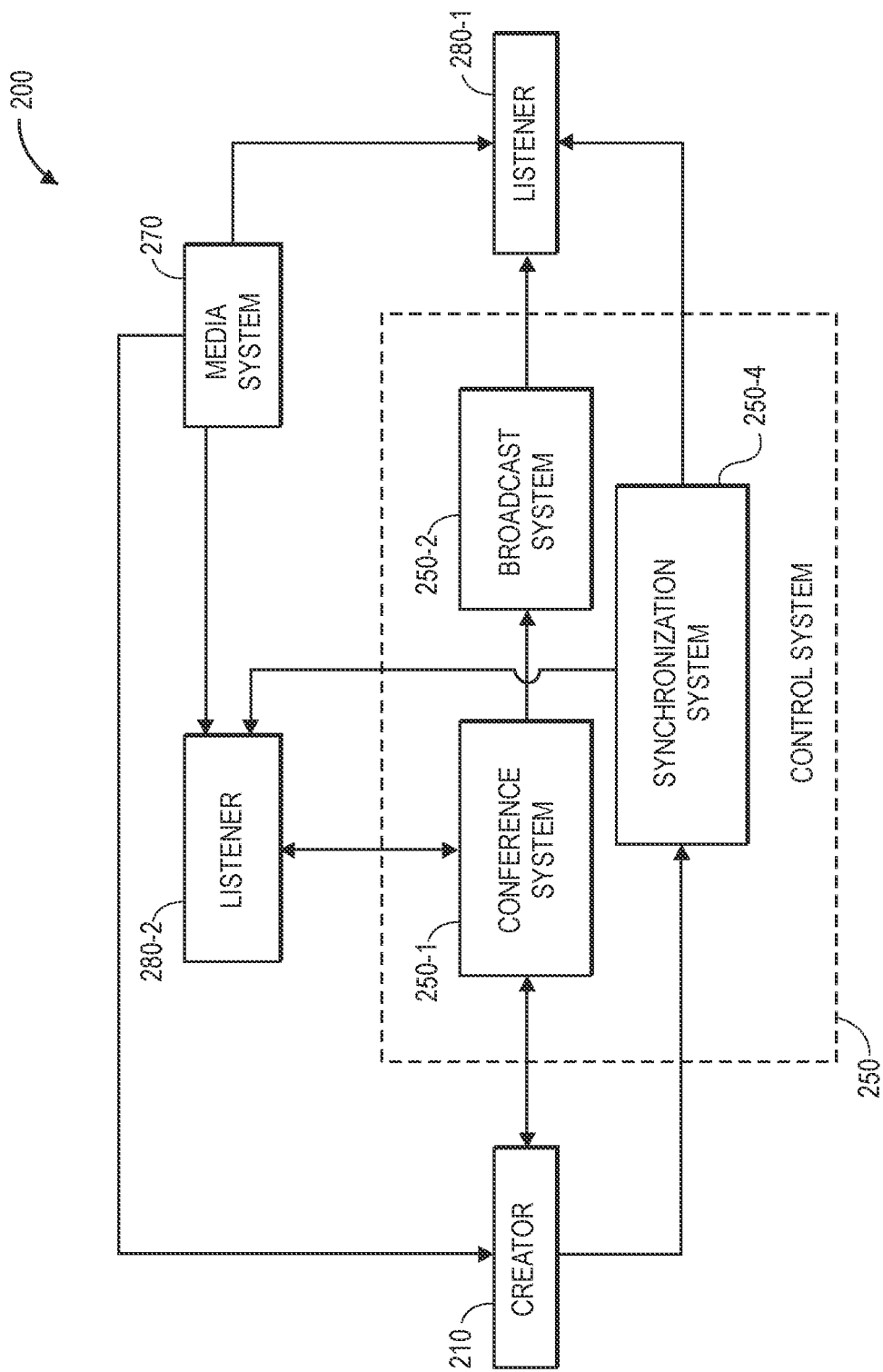

Referring to FIGS. 2A through 2C, block diagrams of components of one system 200 in accordance with embodiments of the present disclosure is shown. Except where otherwise noted, reference numerals preceded by the number "2" shown in FIGS. 2A through 2C indicate components or features that are similar to components or features having reference numerals preceded by the number "1" shown in FIGS. 1A through 1F.

As is shown in FIG. 2A, the system 200 shown in FIG. 2A includes a creator 210, a control system 250, a content source 270, and a listener 280 that are connected to one another over one or more networks 290.

The creator 210 may be any individual or entity that expresses an interest or an intent in constructing a media program including media content, and providing the media program to the listener 280 over the network 290. As is shown in FIG. 2A, the creator 210 is associated with or operates a computer system 212 having a microphone 214, a display 215, a speaker 216 and a transceiver 218, and any other components.

In some implementations, the computer system 212 may be a mobile device, such as a smartphone, a tablet computer, a wristwatch, or others. In some other implementations, the computer system 212 may be a laptop computer or a desktop computer, or any other type or form of computer. In still other implementations, the computer system 212 may be, or may be a part of, a smart speaker, a television, an automobile, a media player, or any other type or form of system having one or more processors, memory or storage components (e.g., databases or other data stores), or other components.

The microphone 214 may be any sensor or system for capturing acoustic energy, including but not limited to piezoelectric sensors, vibration sensors, or other transducers for detecting acoustic energy, and for converting the acoustic energy into electrical energy or one or more electrical signals. The display 215 may be a television system, a monitor or any other like machine having a screen for viewing rendered video content, and may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. The display 215 may be configured to receive content from any number of sources via one or more wired or wireless connections, e.g., the control system 250, the content source 270 or the listener 280, over the networks 290.

In some implementations, the display 215 may be an interactive touchscreen that may not only display information or data but also receive interactions with the information or data by contact with a viewing surface. For example, the display 215 may be a capacitive touchscreen that operates by detecting bioelectricity from a user, or a resistive touchscreen including a touch-sensitive computer display composed of multiple flexible sheets that are coated with a resistive material and separated by an air gap, such that when a user contacts a surface of a resistive touchscreen, at least two flexible sheets are placed in contact with one another.

The speaker 216 may be any physical components that are configured to convert electrical signals into acoustic energy such as electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters.

The transceiver 218 may be configured to enable the computer system 212 to communicate through one or more wired or wireless means, e.g., wired technologies such as Universal Serial Bus (or "USB") or fiber optic cable, or standard wireless protocols such as Bluetooth or any Wireless Fidelity (or "Wi-Fi") protocol, such as over the network 290 or directly. The transceiver 218 may further include or be in communication with one or more input/output (or "I/O") interfaces, network interfaces and/or input/output devices, and may be configured to allow information or data to be exchanged between one or more of the components of the computer system 212, or to one or more other computer devices or systems (e.g., other aerial vehicles, not shown) via the network 290. The transceiver 218 may perform any necessary protocol, timing or other data transformations in order to convert data signals from a first format suitable for use by one component into a second format suitable for use by another component. In some embodiments, the transceiver 218 may include support for devices attached through various types of peripheral buses, e.g., variants of the Peripheral Component Interconnect (PCI) bus standard or the Universal Serial Bus (USB) standard. In some other embodiments, functions of the transceiver 218 may be split into two or more separate components.

In some implementations, the computer system 212 may include a common frame or housing that accommodates the microphone 214, the display 215, the speaker 216 and/or the transceiver 218. In some implementations, applications or functions or features described as being associated with the computer system 212 may be performed by a single system. In some other implementations, however, such applications, functions or features may be split among multiple systems. For example, an auxiliary system, may perform one or more of such applications or functions, or include one or more features, of the computer system 212 or other computer systems or devices described herein, and may exchange any information or data that may be associated with such applications, functions or features with the computer system 212, as necessary. Alternatively, or additionally, the computer system 212 may include one or more power supplies, sensors (e.g., visual cameras or depth cameras), feedback devices (e.g., haptic feedback systems), chips, electrodes, clocks, boards, timers or other relevant features (not shown).

In some implementations, the computer system 212 may be programmed or configured to render one or more user interfaces on the display 215 or in any other manner, e.g., by a browser or another application. The computer system 212 may receive one or more gestures or other interactions with such user interfaces, and such gestures or other interactions may be interpreted to generate one or more instructions or commands that may be provided to one or more of the control system 250, the content source 270 or the listener 280. Alternatively, or additionally, the computer system 212 may be configured to present one or more messages or information to the creator 210 in any other manner, e.g., by voice, and to receive one or more instructions or commands from the creator 210, e.g., by voice.

The control system 250 may be any single system, or two or more of such systems, that is configured to establish or terminate channels or connections with or between the creator 210, the content source 270 or the listener 280, to initiate a media program, or to control the receipt and transmission of media content from one or more of the creator 210, the content source 270 or the listener 280 to the creator 210, the content source 270 or the listener 280. The control system 250 may operate or include a networked computer infrastructure, including one or more physical computer servers 252 and data stores 254 (e.g., databases) and one or more transceivers 256, that may be associated with the receipt or transmission of media or other information or data over the network 290. The control system 250 may also be provided in connection with one or more physical or virtual services configured to manage or monitor such files, as well as one or more other functions. The servers 252 may be connected to or otherwise communicate with the data stores 254 and may include one or more processors. The data stores 254 may store any type of information or data, including media files or any like files containing multimedia (e.g., audio and/or video content), for any purpose. The servers 252 and/or the data stores 254 may also connect to or otherwise communicate with the networks 290, through the sending and receiving of digital data.

In some implementations, the control system 250 may be independently provided for the exclusive purpose of managing the monitoring and distribution of media content. Alternatively, the control system 250 may be operated in connection with one or more physical or virtual services configured to manage the monitoring or distribution of media files, as well as one or more other functions. Additionally, the control system 250 may include any type or form of systems or components for receiving media files and associated information, data or metadata, e.g., over the networks 290. For example, the control system 250 may receive one or more media files via any wired or wireless means and store such media files in the one or more data stores 254 for subsequent processing, analysis and distribution. In some embodiments, the control system 250 may process and/or analyze media files, such as to add or assign metadata, e.g., one or more tags, to media files.

The control system 250 may further broadcast, air, stream or otherwise distribute media files maintained in the data stores 254 to one or more listeners, such as the listener 280 or the creator 210, over the networks 290. Accordingly, in addition to the server 252, the data stores 254, and the transceivers 256, the control system 250 may also include any number of components associated with the broadcasting, airing, streaming or distribution of media files, including but not limited to transmitters, receivers, antennas, cabling, satellites, or communications systems of any type or form. Processes for broadcasting, airing, streaming and distribution of media files over various networks are well known to those skilled in the art of communications and thus, need not be described in more detail herein.

The content source 270 may be a source, repository, bank, or other facility for receiving, storing or distributing media content, e.g., in response to one or more instructions or commands from the control system 250. The content source 270 may receive, store or distribute media content of any type or form, including but not limited to advertisements, music, news, sports, weather, or other programming. The content source 270 may include, but need not be limited to, one or more servers 272, data stores 274 or transceivers 276, which may have any of the same attributes or features of the servers 252, data stores 254 or transceivers 256, or one or more different attributes or features.

In some embodiments, the content source 270 may be an Internet-based streaming content and/or media service provider that is configured to distribute media over the network 290 to one or more general purpose computers or computers that are dedicated to a specific purpose.

For example, in some embodiments, the content source 270 may be associated with a television channel, network or provider of any type or form that is configured to transmit media files over the airwaves, via wired cable television systems, by satellite, over the Internet, or in any other manner. The content source 270 may be configured to generate or transmit media content live, e.g., as the media content is captured in real time or in near-real time, such as following a brief or predetermined lag or delay, or in a pre-recorded format, such as where the media content is captured or stored prior to its transmission to one or more other systems. For example, the content source 270 may include or otherwise have access to any number of microphones, cameras or other systems for capturing audio, video or other media content or signals. In some embodiments, the content source 270 may also be configured to broadcast or stream one or more media files for free or for a one-time or recurring fees. In some embodiments, the content source 270 may be associated with any type or form of network site (e.g., a web site), including but not limited to news sites, sports sites, cultural sites, social networks or other sites, that streams one or more media files over a network. In essence, the content source 270 may be any individual or entity that makes media files of any type or form available to any other individuals or entities over one or more networks 290.

The listener 280 may be any individual or entity having access to one or more computer devices 282, e.g., general purpose or special purpose devices, who has requested (e.g., subscribed to) media content associated with one or more media programs over the network 290. For example, the computer devices 282 may be at least a portion of an automobile, a desktop computer, a laptop computer, a media player, a smartphone, a smart speaker, a tablet computer, a television, or a wristwatch, or any other like machine that may operate or access one or more software applications, and may be configured to receive media content, and present the media content to the listener 280 by one or more speakers, displays or other feedback devices. The computer device 282 may include a microphone 284, a display 285, a speaker 286, a transceiver 288, or any other components described herein, which may have any of the same attributes or features of the computer device 212, the microphone 214, the display 215, the speaker 216 or the transceiver 218 described herein, or one or more different attributes or features. In accordance with the present disclosure, a listener 280 that requests to receive media content associated with one or more media programs may also be referred to as a "subscriber" to such media programs or media content.

Those of ordinary skill in the pertinent arts will recognize that the computer devices 212, 282 may include any number of hardware components or operate any number of software applications for playing media content received from the control system 250 and/or the media sources 270, or from any other systems or devices (not shown) connected to the network 290.

Moreover, those of ordinary skill in the pertinent arts will further recognize that, alternatively, in some implementations, the computer device 282 need not be associated with a specific listener 280. For example, the computer device 282 may be provided in a public place, beyond the control of the listener 280, e.g., in a bar, a restaurant, a transit station, a shopping center, or elsewhere, where any individuals may receive one or more media programs.

The networks 290 may be or include any wired network, wireless network, or combination thereof, and may comprise the Internet, intranets, broadcast networks, cellular television networks, cellular telephone networks, satellite networks, or any other networks, for exchanging information or data between and among the computer systems or devices of the creator 210, the control system 250, the media source 270 or the listener 280, or others (not shown). In addition, the network 290 may be or include a personal area network, local area network, wide area network, cable network, satellite network, cellular telephone network, or combination thereof, in whole or in part. The network 290 may also be or include a publicly accessible network of linked networks, possibly operated by various distinct parties, such as the Internet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

Although the system 200 shown in FIG. 2A shows boxes for one creator 210, one control system 250, one media source 270, one listener 280, and one network 290, those of ordinary skill in the pertinent arts will recognize that any number of creators 210, broadcast systems 250, media sources 270, listeners 280 or networks 290 may be utilized to transmit, receive, access, hear, or view media content provided in accordance with implementations of the present disclosure. Moreover, the computer devices 212, 252, 272, 282 may include all or fewer of the components shown in FIG. 2A or perform all or fewer of the tasks or functions described herein. Tasks or functions described as being executed or performed by a single system or device associated with the creator 210, the control system 250, the media source 270 or the listener 280 may be executed or performed by multiple systems or devices associated with each of the creator 210, the control system 250, the media source 270 or the listener 280. For example, the tasks or functions described herein as being executed or performed by the control system 250 may be performed by a single system, or by separate systems for establishing two-way connections with the creator 210 or any number of media sources 270, or any other systems, e.g., a mixing system, or for establishing one-way connections with any number of media sources 270 or any number of listeners 280 and transmitting data representing media content, e.g., a broadcast system, from such media sources 270 to such listeners 280. Moreover, two or more creators 210 may collaborate on the construction of a media program.

In some implementations, one or more of the tasks or functions described as being executed or performed by the control system 250 may be performed by multiple systems. For example, as is shown in FIG. 2B, the system 200 may include a mixing system 250-1, a conference system 250-2 and a broadcast system 250-3 that may perform one or more of the tasks or functions described herein as being executed or performed by the control system 250.

As is further shown in FIG. 2B, the mixing system 250-1 may be configured to receive data from the conference system 250-2, as well as from one or more content sources 270. For example, in some implementations, the conference system 250-2 may also be configured to establish two-way communications channels with computer devices or systems associated with the creator 210 (or any number of creators) as well as a listener 280-2 (or any number of listeners) or other authorized host, guests, or contributors to a media program associated with one or more of the creators 210, and form a "conference" including each of such devices or systems. The conference system 250-2 may receive data representing media content such as audio signals in the form of words spoken or sung by one or more of the creator 210, the listener 280-2, or other entities connected to the conference system 250-2, or music or other media content played by the one or more of the creator 210, the listener 280-2, or such other entities, and transmit data representing the media content or audio signals to each of the other devices or systems connected to the conference system 250-2.

In some implementations, the mixing system 250-1 may also be configured to establish a two-way communications channel with the conference system 250-2, thereby enabling the mixing system 250-1 to receive data representing audio signals from the conference system 250-2, or transmit data representing audio signals to the conference system 250-2. For example, in some implementations, the mixing system 250-1 may act as a virtual participant in a conference including the creator 210 and any listeners 280-2, and may receive data representing audio signals associated with any participants in the conference, or provide data representing audio signals associated with media content of the media program, e.g., media content received from any of the content sources 270, to such participants.

The mixing system 250-1 may also be configured to establish a one-way communications channel with the content source 270 (or with any number of content sources), thereby enabling the mixing system 250-1 to receive data representing audio signals corresponding to advertisements, songs or media files, news programs, sports programs, weather reports or any other media files, which may be live or previously recorded, from the content source 270. The mixing system 250-1 may be further configured to establish a one-way communications channel with the broadcast system 250-3, and to transmit data representing media content received from the creator 210 or the listener 280-2 by way of the conference channel 250-2, or from any content sources 270, to the broadcast system 250-3 for transmission to any number of listeners 280-1.

The mixing system 250-1 may be further configured to receive information or data from one or more devices or systems associated with the creator 210, e.g., one or more instructions for operating the mixing system 250-1. For example, in some implementations, the mixing system 250-1 may be configured to cause any number of connections to be established between devices or systems and one or more of the conference system 250-2 or the broadcast system 250-3, or for causing data representing media content of any type or form to be transmitted to one or more of such devices or systems in response to such instructions. In some implementations, the mixing system 250-1 may also be configured to initiate or modify the playing of media content, such as by playing, pausing or stopping the media content, advancing (e.g., "fast-forwarding") or rewinding the media content, increasing or decreasing levels of volume of the media content, or setting or adjusting any other attributers or parameters (e.g., treble, bass, or others) of the media content, in response to such instructions or automatically.

The broadcast system 250-3 may be configured to establish one-way communications channels with any number of listeners 280-1, and to transmit data representing media content received from the mixing system 250-1 or the conference system 250-2 to each of such listeners 280-1.

In some implementations, one or more of the tasks or functions described as being executed or performed by a control system 250, or by multiple systems, may be orchestrated or otherwise controlled by a single system, e.g., a synchronization system. As is shown in FIG. 2C, the system 200 may include a control system 250 in communication with a creator 210 of a media program, a listener 280-1 to the media program and, optionally, a listener 280-2 to the media program. The control system 250 may be a single computer device or system, e.g., a server, or a collection of multiple computer devices or systems that are coupled to or otherwise associated with one another.

The creator 210 and the listener 280-2 are connected to a conference system 250-1 of the control system 250 by two-way communications channels (e.g., a conference channel). Additionally, a broadcast system 250-2 of the control system 250 is connected to the conference system 250-1 by a one-way communications channel or, alternatively, a two-way communications channel. Likewise, the listener 280-1 is also connected to the broadcast system 250-2 by a one-way communications channel (e.g., a broadcast channel). Thus, the conference system 250-1 is capable of receiving audio data representing live media content (e.g., voices of spoken or sung words) of the creator 210 or the listener 280-2, and transmitting such audio data to the devices of the creator 210 and the listener 280-2 directly, as well as to a device of the listener 280-1 via the broadcast system 250-2.

Additionally, a media system 270 (e.g., a source of previously recorded media content of any type or form) is connected to each of the creator 210, the listener 280-1 and the listener 280-2, e.g., by one-way communications channels. Thus, the media system 270 is configured for transmitting audio data representing previously recorded media content (e.g., songs or other media entities) to devices of each of the creator 210 and the listener 280-2 directly, as well as to the device of the listener 280-1. The media system 270 may be a music catalog, a repository or a streaming service having access to any number of songs or other media entities. Alternatively, the media system 270 may have access to any other media entities, including but not limited to advertisements, news, sports or weather programs, or any others.

A synchronization system 250-4 of the control system 250 is in communication with each of the creator 210, the listener 280-1 and the listener 280-2. When the creator 210 executes one or more instructions or commands regarding a media program, the synchronization system 250-4 interprets such instructions or commands to determine whether the media program is in a live state (or a live media state, or a voice state), during which the media program is primarily dedicated to airing live media content, such as voices of the creator 210 or the listener 280-2, or a pre-recorded state (or a media state, or a pre-recorded media state), during which the media program is primarily dedicated to airing previously recorded media content, such as songs or other media entities. The synchronization system 250-4 then transmits instructions or commands to the device of the listener 280-1 and the device of the listener 280-2, in a manner consistent with the instructions or commands of the creator 210, to ensure that such devices play voices or media in a synchronized manner.

For example, when the media program transitions from a live state (or a live media state, or a voice state) to a music state (or a pre-recorded state, or a pre-recorded media state), or vice versa, the synchronization system 250-4 may transmit instructions for playing audio data representing media entities (or other pre-recorded content) or audio data representing live media content (e.g., voices or other live content), to devices of the creator 210, the listener 280-1 or the listener 280-2, such that a transition from the live state to the pre-recorded state, or vice versa, occurs seamlessly in accordance with the media program. Alternatively, the synchronization system 250-4 may be a software module that operates in parallel with audio channels associated with the conference system 250-1 or the broadcast system 250-2, and transmits instructions or commands regarding the playing of media content that are consistent with instructions or commands of the creator via a data channel.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The computer devices 212, 282 or the servers 252, 272, and any associated components, may use any web-enabled or Internet applications or features, or any other client-server applications or features including E-mail or other messaging techniques, to connect to the networks 290, or to communicate with one another, such as through short or multimedia messaging service (SMS or MMS) text messages. For example, the computer devices 212, 282 or the servers 252, 272 may be configured to transmit information or data in the form of synchronous or asynchronous messages to one another in real time or in near-real time, or in one or more offline processes, via the networks 290. Those of ordinary skill in the pertinent art would recognize that the creator 210, the control system 250 (or the mixing system 250-1, the conference system 250-2, the broadcast system 250-3, or the synchronization system 250-4), the media source 270 or the listener 280 (or the listeners 280-1, 280-2) may include or operate any of a number of computing devices that are capable of communicating over the networks 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as computer devices 212, 282 or the servers 252, 272, or to any other computers or control systems utilized by the creator 210, the control system 250 (or the mixing system 250-1, the conference system 250-2, the broadcast system 250-3, or the synchronization system 250-4), the media source 270 or the listener 280 (or the listeners 280-1, 280-2), and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMS, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks, e.g., the network 290.

Figure 3:
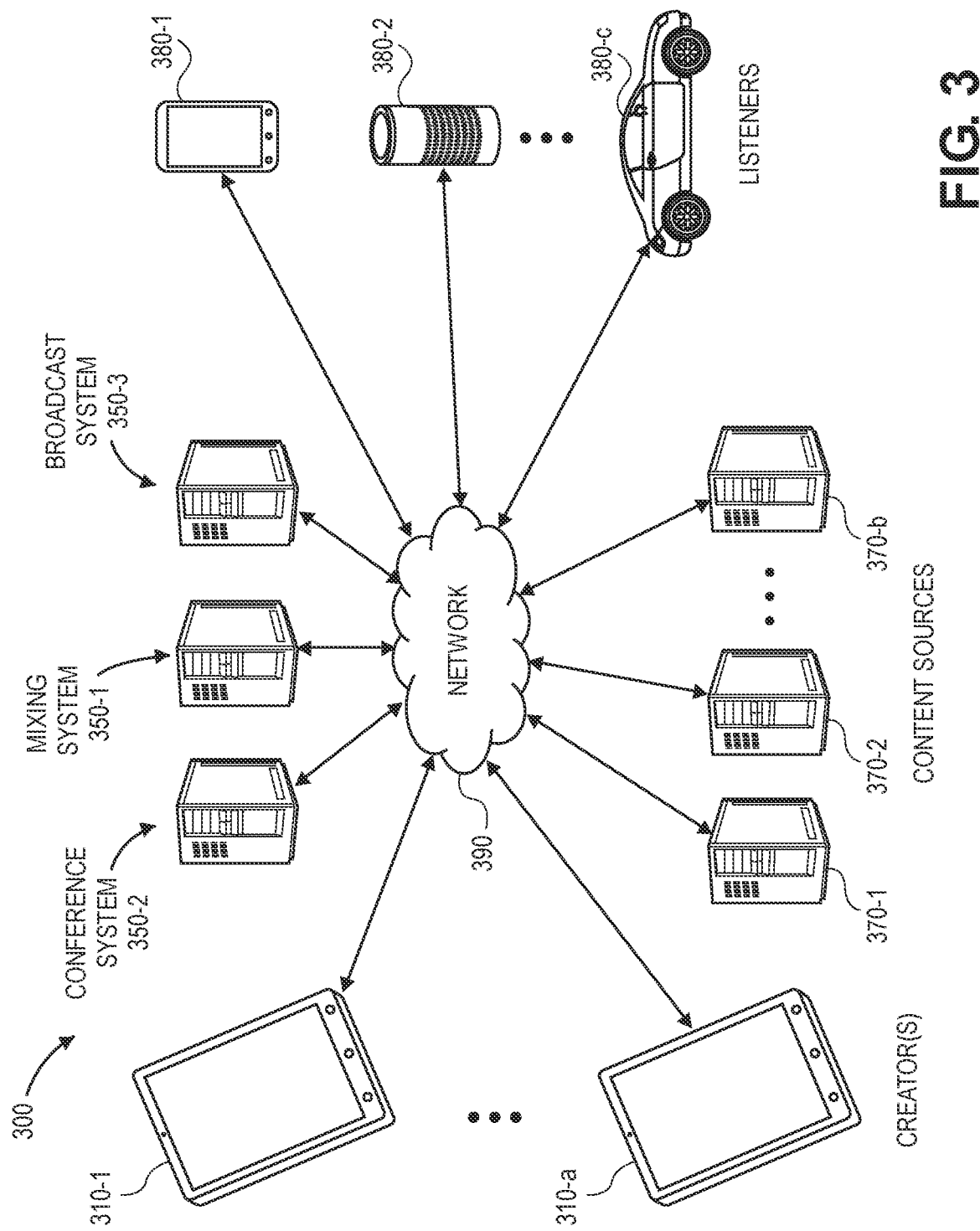
FIG. 3 is a view of aspects of one system in accordance with embodiments of the present disclosure.

Referring to FIG. 3, a view of aspects of one system in accordance with embodiments of the present disclosure is shown. Except where otherwise noted, reference numerals preceded by the number "3" shown in FIG. 3 indicate components or features that are similar to components or features having reference numerals preceded by the number "2" shown in FIG. 2A through FIG. 2C or by the number "1" shown in FIGS. 1A through 1F. As is shown in FIG. 3, the system 300 includes computer systems or devices of a plurality of creators 310-1 . . . 310-a, a mixing system 350-1, a conference system 350-2, a broadcast system 350-3, a plurality of content sources 370-1, 370-2 . . . 370-b and a plurality of listeners 380-1, 380-2 . . . 380-c that are connected to one another over a network 390, which may include the Internet in whole or in part.

The creators 310-1 . . . 310-a may operate a computer system or device having one or more microphones, an interactive display, one or more speakers, one or more processors and one or more transceivers configured to enable communication with one or more other computer systems or devices. In some implementations, the creators 310-1 . . . 310-a may operate a smartphone, a tablet computer or another mobile device, and may execute interactions with one or more user interfaces rendered thereon, e.g., by a mouse, a stylus, a touchscreen, a keyboard, a trackball, or a trackpad, as well as any voice-controlled devices or software (e.g., a personal assistant). Interactions with the user interfaces may be interpreted and transmitted in the form of instructions or commands to the mixing system 350-1, the conference system 350-2 or the broadcast system 350-3. Alternatively, the creators 310-1 . . . 310-a may operate any other computer system or device, e.g., a laptop computer, a desktop computer, a smart speaker, a media player, a wristwatch, a television, an automobile, or any other type or form of system having one or more processors, memory or storage components (e.g., databases or other data stores), or other components.

Additionally, the mixing system 350-1 may be any server or other computer system or device configured to receive information or data from the creators 310-1 . . . 310-a, or any of the listeners 380-1, 380-2 . . . 380-c, e.g., by way of the conference system 350-2, or from any of the media sources 370-1, 370-2 . . . 370-b over the network 390. The mixing system 350-1 may be further configured to transmit any information or data to the broadcast system 350-3 over the network 390, and to cause the broadcast system 350-3 to transmit any of the information or data to any of the listeners 380-1, 380-2 . . . 380-c, in accordance with a broadcast plan (or a sequence of media content, or another schedule), or at the direction of the creators 310-1 . . . 310-a. The mixing system 350-1 may also transmit or receive information or data along such communication channels, or in any other manner. The operation of the mixing system 350-1, e.g., the establishment of connections, or the transmission and receipt of data via such connections, may be subject to the control or discretion of any of the creators 310-1 . . . 310-*a*.

In some implementations, the mixing system 350-1 may receive media content from one or more of the media sources 370-1, 370-2 . . . 370-*b*, and cause the media content to be transmitted to one or more of the creators 310-1 . . . 310-*a* or the listeners 380-1, 380-2 . . . 380-*c* by the broadcast system 350-3. In some other implementations, the mixing system 350-1 may receive media content from one or more of the media sources 370-1, 370-2 . . . 370-*b*, and mix, or combine, the media content with any media content received from the creators 310-1 . . . 310-*a* or any of the listeners 380-1, 380-2 . . . 380-*c*, before causing the media content to be transmitted to one or more of the creators 310-1 . . . 310-*a* or the listeners 380-1, 380-2 . . . 380-*c* by the conference system 350-2 or the broadcast system 350-3. For example, in some implementations, the mixing system 350-1 may receive media content (e.g., audio content and/or video content) captured live by one or more sensors of one or more of the media sources 370-1, 370-2 . . . 370-*b*, e.g., cameras and/or microphones provided at a location of a sporting event, or any other event, and mix that media content with any media content received from any of the creators 310-1 . . . 310-*a* or any of the listeners 380-1, 380-2 . . . 380-*c*. In such embodiments, the creators 310-1 . . . 310-*a* may act as sportscasters, news anchors, weathermen, reporters or others, and may generate a media program that combines audio or video content captured from a sporting event or other event of interest, along with audio or video content received from one or more of the creators 310-1 . . . 310-*a* or any of the listeners 380-1, 380-2 . . . 380-*c* before causing the media program to be transmitted to the listeners 380-1, 380-2 . . . 380-*c* by the conference system 350-2 or the broadcast system 350-3.

In some implementations, the conference system 350-2 may establish two-way communications channels between any of the creators 310-1 . . . 310-*a* and, alternatively, any of the listeners 380-1, 380-2 . . . 380-*c*, who may be invited or authorized to participate in a media program, e.g., by providing media content in the form of spoken or sung words, music, or any media content, subject to the control or discretion of the creators 310-1 . . . 310-*a*. Devices or systems connected to the conference system 350-2 may form a "conference" by transmitting or receiving information or data along such communication channels, or in any other manner. The operation of the mixing system 350-1, e.g., the establishment of connections, or the transmission and receipt of data via such connections, may be subject to the control or discretion of the creators 310-1 . . . 310-*a*. In some implementations, the mixing system 350-1 may effectively act as a virtual participant in such a conference, by transmitting media content received from any of the media sources 370-1, 370-2 . . . 370-*b* to the conference system 350-2 for transmission to any devices or systems connected thereto, and by receiving media content from any of such devices or systems by way of the conference system 350-2 and transmitting the media content to the broadcast system 350-3 for transmission to any of the listeners 380-1, 380-2 . . . 380-*c*.

Likewise, the broadcast system 350-3 may be any server or other computer system or device configured to receive information or data from the mixing system 350-1, or transmit any information or data to any of the listeners 380-1, 380-2 . . . 380-*c* over the network 390. In some implementations, the broadcast system 350-3 may establish one-way communications channels with the mixing system 350-1 or any of the listeners 380-1, 380-2 . . . 380-*c* in accordance with a broadcast plan (or a sequence of media content, or another schedule), or at the direction of the creators 310-1 . . . 310-*a*. The broadcast system 350-3 may also transmit or receive information or data along such communication channels, or in any other manner. The operation of the broadcast system 350-3, e.g., the establishment of connections, or the transmission of data via such connections, may be subject to the control or discretion of the creators 310-1 . . . 310-*a*.

The content sources 370-1, 370-2 . . . 370-*b* may be servers or other computer systems having media content stored thereon, or access to media content, that are configured to transmit media content to the creators 310-1 . . . 310-*a* or any of the listeners 380-1, 380-2 . . . 380-*c* in response to one or more instructions or commands from the creators 310-1 . . . 310-*a* or the mixing system 350-1. The media content stored on or accessible to the content sources 370-1, 370-2 . . . 370-*b* may include one or more advertisements, songs or media files, news programs, sports programs, weather reports or any other media files, which may be live or previously recorded. The number of content sources 370-1, 370-2 . . . 370-*b* that may be accessed by the mixing system 350-1, or the types of media content stored thereon or accessible thereto, is not limited.

The listeners 380-1, 380-2 . . . 380-*c* may also operate any type or form of computer system or device configured to receive and present media content, e.g., at least a portion of an automobile, a desktop computer, a laptop computer, a media player, a smartphone, a smart speaker, a tablet computer, a television, or a wristwatch, or others.

The mixing system 350-1, the conference system 350-2 or the broadcast system 350-3 may establish or terminate connections with the creators 310-1 . . . 310-*a*, with any of the content sources 370-1, 370-2 . . . 370-*b*, or with any of the listeners 380-1, 380-2 . . . 380-*c*, as necessary, to compile and seamlessly transmit media programs over digital channels (e.g., web-based or application-based), to devices of the creators 310-1 . . . 310-*a* or the listeners 380-1, 380-2 . . . 380-*c* in accordance with a broadcast plan, or subject to the control of the creators 310-1 . . . 310-*a*. Furthermore, in some implementations, one or more of the listeners 380-1, 380-2 . . . 380-*c*, e.g., musicians, celebrities, personalities, athletes, politicians, or artists, may also be content sources. For example, where the broadcast system 350-3 has established one-way channels, e.g., broadcast channels, with any of the listeners 380-1, 380-2 . . . 380-*c*, the mixing system 350-1 may terminate one of the one-way channels with one of the listeners 380-1, 380-2 . . . 380-*c*, and cause the conference system 350-2 to establish a two-directional channel with that listener, thereby enabling that listener to not only receive but also transmit media content to the creators 310-1 . . . 310-*a* or any of the other listeners.

Those of ordinary skill in the pertinent arts will recognize that any of the tasks or functions described above with respect to the mixing system 350-1, the conference system 350-2 or the broadcast system 350-3 may be performed by a single device or system, e.g., a control system, or by any number of devices or systems.

Figure 4A:
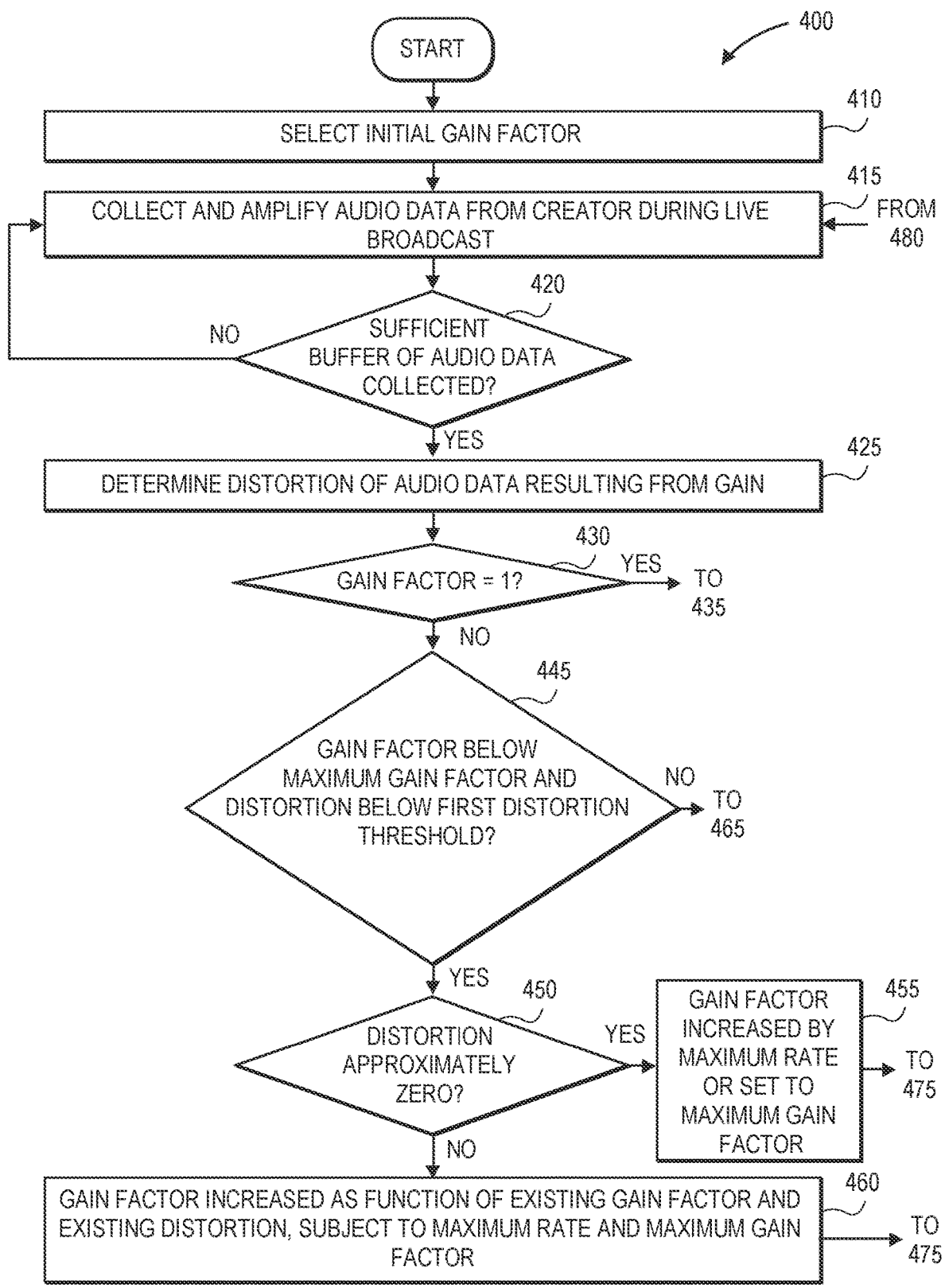
FIGS. 4A and 4B are a flow chart of one process in accordance with embodiments of the present disclosure.
Figure 4B:
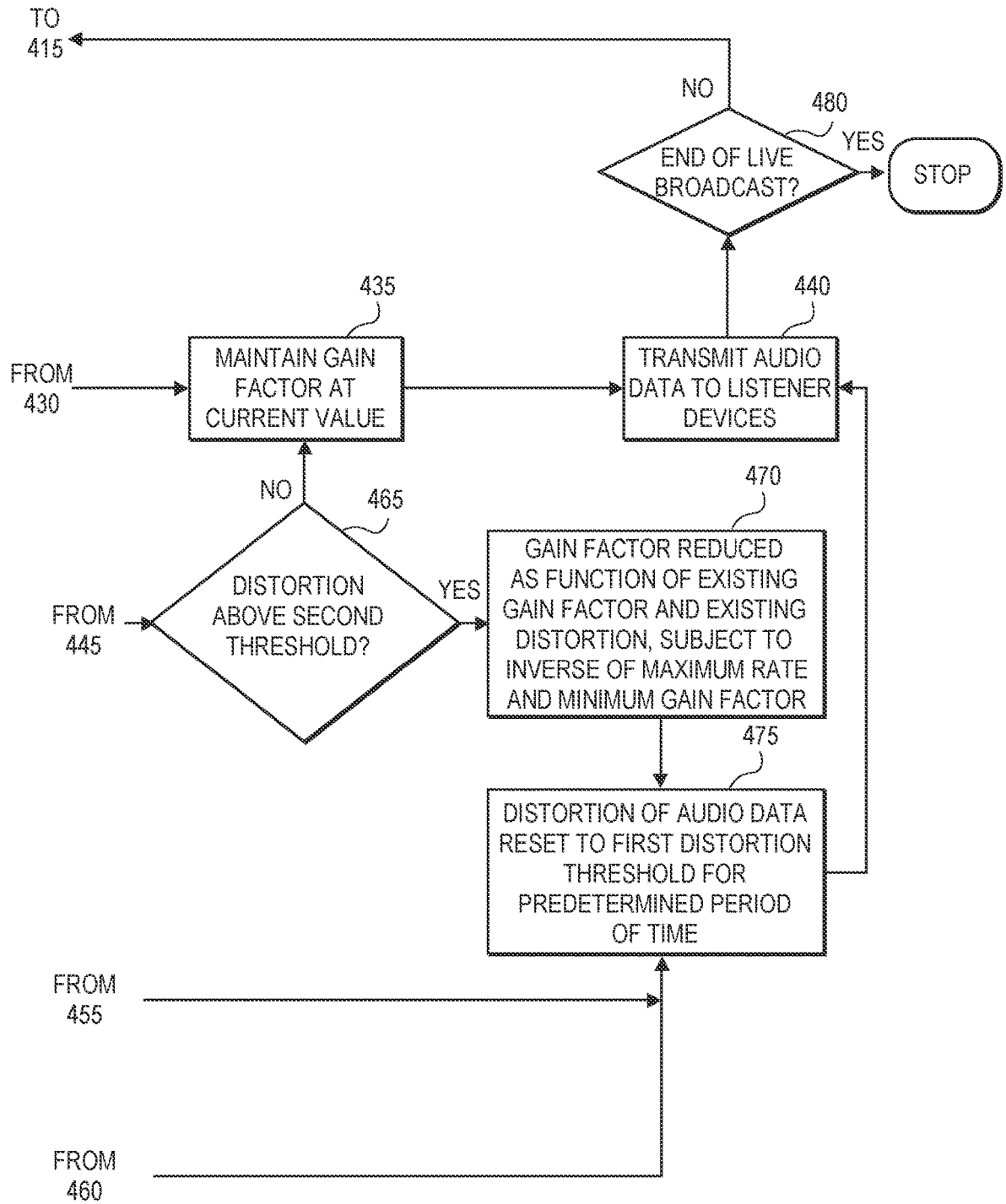

Referring to FIGS. 4A and 4B, a flow chart of one process in accordance with embodiments of the present disclosure is shown. At box 410, an initial gain factor is selected. The initial gain factor may be an amount of amplification to be applied to audio data, and may represent a ratio of an output power or strength to an input power or strength, measured in decibels or any other units. Where a live broadcast is subject to one or more limits on intensity of sounds to be played on devices of listeners to the live broadcast, an amplification, or gain, may be applied to portions of audio data received from a creator, such as a buffer of the audio data, to ensure that the audio data is sufficiently strong for playing by devices of listeners.

The initial gain factor may be selected on any basis. In some implementations, the initial gain factor may be set to a factor of two, which corresponds to approximately six decibels (or 6 dB) of gain. Alternatively, the initial gain factor may be set to any number greater than one, or equal to one if audio data is not to be amplified.

At box 415, audio data is collected from a creator during a live broadcast and amplified according to a gain factor. For example, the audio data may be collected by one or more microphones or other acoustic sensors provided on a mobile device (e.g., a smartphone, a tablet computer, a wristwatch), a smart speaker, or another personal device, or any other computer device. The gain factor may be an initial gain factor selected at box 410, or a most recent gain factor determined at box 435, box 455, box 460 or box 470, as discussed below.

The audio data may include or represent spoken or sung words, or any other content generated by the creator. A computer device or system that captured the audio data may have established a two-way connection or communications channel with a conference system over one or more networks, which may include the Internet in whole or in part, or with any other system over such networks, and may be configured to transmit the audio data to the conference system or any other system in real time or near-real time for transmission to one or more devices of listeners to an episode of a media program.

In some implementations, the audio data may have been captured by an auxiliary device (or secondary device) configured for direct communication, e.g., one-way or two-way wireless communication, with a main device (or primary device) of the creator that is configured to transmit audio data to a conference system or another system over one or more wireless networks.

At box 420, whether a sufficient buffer of the audio data has been collected is determined. In some implementations, sufficiency of a buffer may be determined based on an elapsed time or duration of the audio data, e.g., a predefined amount of time, such as three seconds, or any other elapsed time or duration. In some implementations, sufficiency of the buffer may be determined based on an elapsed time or duration of spoken or sung words represented in the audio data, e.g., exclusive of pauses (or blank time or silent time) represented in the audio data.

The elapsed time or duration of the buffer may be selected on any basis. For example, in some implementations, the buffer may be selected to ensure that the audio data is sufficiently large and diverse to calculate gains, determine distortions, or process in any other manner or on any other basis.

A pause may be defined in any manner or selected on any basis. In some implementations, a pause may be defined as any finite duration during which a peak amplitude of audio data captured is less than two percent of a maximum amplitude of an allowable dynamic range. In some implementations, a pause may be defined by a finite duration of fifty milliseconds (50 ms) or longer.

If a sufficient buffer of the audio data has not been collected, then the process returns to box 415, where audio data from the creator during the live broadcast is collected.

If a sufficient buffer of the audio data has been collected, then the process advances to box 425, where a level of distortion of the audio data is determined. For example, where the audio data is amplified, portions of the audio data may transcend or move beyond a maximum allowable dynamic range as a result of the amplification. The amplified audio data may be subject to clipping or other processing, to limit maximum values of the audio data, which may result in a distortion of at least a portion of the audio data. In some implementations, the distortion may result from "hard" clipping, such as where a value of an amplitude of an audio signal is strictly limited to a maximum amplitude, e.g., by removing positive or negative peaks of the audio signal beyond the maximum amplitude, thereby ensuring that the audio data played by devices of listeners remains within the allowable dynamic range. In some implementations, the distortion may result from "soft" clipping, such as where smoothed transitions (or rounding) between unclipped portions and clipped portions of the audio data are applied. An audio signal that results from soft clipping has a distortion effect by which an amplitude of the signal is limited to a maximum amplitude but is saturated, e.g., smoothly curved, rather than having one or more abrupt breaks corresponding to the maximum amplitude.

At box 430, whether a current value of the gain factor is equal to one, or unity, such that no amplification is applied to the audio data, is determined. If the value of the gain factor is one, then the process advances to box 435, where the gain factor remains unchanged. The process then further advances to box 440, where the audio data is transmitted to devices of listeners to the live broadcast, e.g., amplified according to a gain factor calculated most recently based on the level of distortion determined at box 425. For example, in some implementations, the audio data may be transmitted to a control system (or another system) from one or more personal devices of the creator, e.g., a mobile device, via a two-way conference channel over one or more networks, and subsequently to one or more devices of listeners over a one-way broadcast channel, or in any other manner.

At box 480, whether the live broadcast has ended is determined. If the live broadcast has ended, then the process ends. If the live broadcast has not ended, however, then the process returns to box 415, where additional audio data is collected from the creator during the live broadcast and amplified, viz., according to a most recently determined gain factor.

If the gain factor is determined to not equal one at box 430, however, then the process advances to box 445, where whether the gain factor is below a maximum gain factor, and whether the distortion is below a first distortion threshold (or a low distortion threshold) of a target distortion range, are determined. The maximum gain factor may be defined in any manner. For example, in some implementations, the maximum gain factor may be set to a factor of ten, or an equivalent of twenty decibels (20 dB) of gain. Alternatively, the maximum gain factor may be set to any number greater than one, or to a value of one if amplification is to be bypassed for any reason.

The first distortion threshold may be defined or set with respect to a gain overhead, such as one decibel, or any other value, which may be set or selected on any basis. In some implementations, the first distortion threshold may be set equal to approximately 0.7% distortion.

If the gain factor is determined to be below the maximum gain factor at box 445, and the distortion is below the first distortion threshold of the target distortion range, then the process advances to box 450, where whether the distortion is approximately zero may be determined. For example, in some implementations, where the distortion is approximately zero, no portion of the audio data collected and amplified at box 415 had a value greater than a maximum value, or otherwise required clipping. Any criteria may be used to determine whether distortion is approximately zero. In some implementations, distortions of "approximately zero" may be determined to be or include distortion levels at or below 0.005%. Alternatively, a distortion of "approximately zero" may be defined according to any other standard.

If the distortion is determined to be approximately zero, then the process advances to box 455, where the gain factor is increased by a maximum rate of change or set to the maximum gain factor. For example, where limited to no distortion is observed following the amplification of audio data by a most recently calculated gain factor, the gain factor may be increased by a predetermined multiple (e.g., doubled, tripled, or in any other manner), subject to a maximum gain factor, with a reasonable expectation that distortion within or below a target distortion range may be observed.

If the distortion is determined to not be approximately zero, then the process advances to box 460, wherein the gain factor is increased as a function of a most recently calculated gain factor and the distortion determined at box 425, subject to the maximum rate of change or the maximum gain factor. For example, as is discussed above, where a level of distortion observed following amplification of the audio data by a most recently calculated gain factor is greater than zero, a gain factor that will enable an amplification of audio while maintaining distortion within a target distortion range may be determined by multiplying the gain factor by a plurality of factors. In some implementations, the gain factor may be calculated by multiplying a quotient of a second distortion threshold (e.g., a high distortion threshold) of the target distortion range by the distortion determined at box 425, to an exponent, by the most recently calculated gain factor and a gain factor overhead. The exponent may be selected or set to result in an acceptable distortion ratio. Alternatively, another value of the exponent may be selected based on an order of polynomial of a clipping formula, or on any other basis.

If the gain factor is determined to be above the maximum gain factor or the distortion is determined to be above the first distortion threshold of the target distortion range at box 445, then the process advances to box 465, where whether the distortion is above the second distortion threshold of the target distortion range, viz., beyond the target distortion range, is determined.

If the distortion is not above the second distortion threshold, such that the distortion is within the target distortion range (e.g., at or above the first distortion threshold and at or below the second distortion threshold), then the process advances to box 435, where the gain factor is maintained at a current value, and to box 440, where the audio data is transmitted to the listener devices.

If the distortion is above the second distortion threshold of the target distortion range, however, then the process advances to box 470, where the gain factor is reduced as a function of the most recently calculated gain factor and the distortion determined at box 425, subject to unity and an inverse of the maximum rate of change. For example, where the distortion determined at box 425 is beyond the target distortion range, or greater than the second distortion threshold, a gain factor may be calculated by multiplying a quotient of the second distortion threshold divided by the distortion determined at box 425, to an exponent, by the most recently calculated gain factor and a gain factor overhead factor. The exponent may be selected or set to result in an acceptable distortion ratio, which may be determined as a function of an order of polynomial of a clipping formula. Alternatively, another value of the exponent may be selected based on an order of polynomial of a clipping formula, or on any other basis.

After the gain factor has been increased at box 455 or box 460, or after the gain factor has been decreased at box 470, the process advances to box 475, where the distortion of the audio data is reset to the first distortion threshold for a predetermined period of time. Resetting the distortion to the first distortion threshold, e.g., the low distortion threshold of a target distortion range, reduces excessive gain changes, which may result in undesirable sounds, and ensures that changes in gain are gradual and smooth-sounding. Alternatively, in some implementations, the predetermined period of time may be set to zero, as if no audio data had been collected, or set to any other time or duration.

The process then advances to box 440, where the audio data is transmitted to devices of listeners to the live broadcast, e.g., amplified according to the gain factors as increased or decreased at box 455, box 460 or box 470.

At box 480, whether the live broadcast has ended is determined. If the live broadcast has ended, then the process ends. If the live broadcast has not ended, however, then the process returns to box 415, where additional audio data is collected from the creator during the live broadcast and amplified, e.g., according to a current value of the gain factor.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

Likewise, although some of the embodiments described herein or shown in the accompanying figures refer to media programs including audio files, the systems and methods disclosed herein are not so limited, and the media programs described herein may include any type or form of media content, including not only audio but also video, which may be transmitted to and played on any number of devices of any type or form.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIGS. 4A and 4B, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, one or more left-most digit (s) of a reference number identify a figure or figures in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A system comprising:
a computer device associated with a creator of a media program;
a conference system in communication with at least the computer device associated with the creator via a two-way communication channel; and
a broadcast system, wherein the broadcast system is in communication with the conference system via a one-way communication channel and with each of a plurality of devices via one-way communication channels, wherein each of the plurality of devices is associated with at least one listener to the media program, and
wherein the conference system is programmed with one or more sets of instructions that, when executed by the conference system, cause the conference system to at least:
  receive first audio data from the computer device associated with the creator over one or more networks, wherein the first audio data represents a first plurality of words spoken or sung by the creator;
  amplify at least a portion of the first audio data according to a first gain factor;
  subject the amplified first audio data to clipping;
  transmit the amplified first audio data to the plurality of devices via the broadcast system over the one or more networks following the clipping;
  determine a first level of distortion of the amplified first audio data following the clipping;
  determine that a value of the first level of distortion is below a targeted distortion range;
  in response to determining that the value of the first level of distortion is below the targeted distortion range,
  calculate a second gain factor as a product of:
    a quotient of a high threshold of the targeted distortion range divided by the first level of distortion, to a first exponent, wherein the first exponent is selected based at least in part on distortions of representative audio data determined upon amplifying the representative audio data by various gain factors;
    the first gain factor; and
    a gain factor overhead;
  receive second audio data from the computer device associated with the creator over the one or more networks, wherein the second audio data represents a second plurality of words spoken or sung by the creator;

amplify at least a portion of the second audio data according to the second gain factor;
subject the amplified second audio data to clipping; and
transmit the amplified second audio data to the plurality of devices via the broadcast system over the one or more networks following the clipping.

2. The system of claim 1, wherein the portion of the first audio data has a duration of approximately three seconds without any pauses between spoken or sung words.

3. A system comprising:
a computer device associated with a creator of a media program;
a conference system in communication with at least the computer device associated with the creator via a two-way communication channel; and
a broadcast system, wherein the broadcast system is in communication with the conference system via a one-way communication channel and with each of a plurality of devices via one-way communication channels, wherein each of the plurality of devices is associated with at least one listener to the media program, and
wherein the conference system is programmed with one or more sets of instructions that, when executed by the conference system, cause the conference system to at least:
receive first audio data from the computer device associated with the creator over one or more networks, wherein the first audio data represents a first plurality of words spoken or sung by the creator;
amplify at least a portion of the first audio data according to a first gain factor;
subject the amplified first audio data to clipping;
transmit the amplified first audio data to the plurality of devices via the broadcast system over the one or more networks following the clipping;
determine a first level of distortion of the amplified first audio data following the clipping;
determine that a value of the first level of distortion is above a targeted distortion range; and
in response to determining that the value of the first level of distortion is above the targeted distortion range,
calculate a second gain factor as a product of:
a quotient of a high threshold of the targeted distortion range divided by the first level of distortion, to a first exponent, wherein the first exponent is selected based at least in part on distortions of representative audio data determined upon amplifying the representative audio data by various gain factors;
the first gain factor; and
a gain factor overhead;
receive second audio data from the computer device associated with the creator over the one or more networks, wherein the second audio data represents a second plurality of words spoken or sung by the creator;
amplify at least a portion of the second audio data according to the second gain factor;
subject the amplified second audio data to clipping; and
transmit the amplified second audio data to the plurality of devices via the broadcast system over the one or more networks following the clipping.

4. The system of claim 1, wherein the second computer system is at least a portion of:
a desktop computer;
a laptop computer;
a smartphone;
a tablet computer;
a television; or
a wristwatch.

5. The system of claim 3, wherein the portion of the first audio data has a duration of approximately three seconds without any pauses between spoken or sung words.

6. A computer-implemented method comprising:
receiving, by a first computer system over one or more networks, first audio data from a second computer system over one or more networks, wherein the second computer system is associated with a creator of a media program;
amplifying, by the first computer system, at least a portion of the first audio data according to a first gain factor;
subjecting the amplified first audio data to clipping;
transmitting the amplified first audio data to at least a third computer system over the one or more networks;
determining a first level of distortion of the amplified first audio data following the clipping;
determining that a value of the first level of distortion is below a targeted distortion range; and
in response to determining that the value of the first level of distortion is below the targeted distortion range,
calculating the second gain factor as a product of:
a quotient of a high threshold of the targeted distortion range divided by the first level of distortion, to a first exponent calculated based on distortions of representative audio data measured after amplifying the representative audio data by a plurality of gain factors;
the first gain factor; and
a gain factor overhead.

7. The computer-implemented method of claim 6, further comprising:
receiving, by the first computer system, second audio data from the second computer system over the one or more networks, wherein the second audio data was captured by the at least one microphone provided on the second computer system;
amplifying, by the first computer system, at least a portion of the second audio data according to the second gain factor;
subjecting the amplified second audio data to clipping; and
transmitting the amplified second audio data to at least the third computer system over the one or more networks.

8. The computer-implemented method of claim 6, wherein the portion of the first audio data has a duration of approximately three seconds without any pauses between spoken or sung words.

9. The computer-implemented method of claim 6, further comprising:
establishing a two-way communications channel between the second computer system and a conference system, wherein the conference system is configured to receive audio data from any computer device having a communications channel established with the conference system and to transmit the audio data to any computer device having a communications channel established with the conference system; and
establishing a one-way communications channel between the third computer system and a broadcast system, wherein the broadcast system is configured to receive audio data from the conference system and to transmit the audio data to any computer device having a communications channel established with the broadcast system.

10. The computer-implemented method of claim 6, wherein the second computer system is at least a portion of:
   a desktop computer;
   a laptop computer;
   a smartphone;
   a tablet computer;
   a television; or
   a wristwatch, and
   wherein the first audio data is captured by at least one microphone provided on the second computer system.

11. A computer-implemented method comprising:
   receiving, by a first computer system over one or more networks, first audio data from a second computer system over one or more networks, wherein the second computer system is associated with a creator of a media program;
   amplifying, by the first computer system, at least a portion of the first audio data according to a first gain factor;
   subjecting the amplified first audio data to clipping;
   transmitting the amplified first audio data to at least a third computer system over the one or more networks;
   determining a first level of distortion of the amplified first audio data following the clipping; and
   determining that a value of the first level of distortion is above a targeted distortion range; and
   in response to determining that the value of the first level of distortion is above the targeted distortion range,
   calculating a second gain factor as a product of:
      a quotient of a high threshold of the targeted distortion range divided by the first level of distortion, to a first exponent calculated based on distortions of representative audio data measured after amplifying the representative audio data by a plurality of gain factors;
      the first gain factor; and
      a gain factor overhead.

12. The computer-implemented method of claim 11, wherein the second computer system is at least a portion of:
   a desktop computer;
   a laptop computer;
   a smartphone;
   a tablet computer;
   a television; or
   a wristwatch, and
   wherein the first audio data is captured by at least one microphone provided on the second computer system.

13. The computer-implemented method of claim 11, further comprising:
   receiving, by the first computer system, second audio data from the second computer system over the one or more networks, wherein the second audio data was captured by the at least one microphone provided on the second computer system;
   amplifying, by the first computer system, at least a portion of the second audio data according to the second gain factor;
   subjecting the amplified second audio data to clipping; and
   transmitting the amplified second audio data to at least the third computer system over the one or more networks.

14. The computer-implemented method of claim 11, wherein the portion of the first audio data has a duration of approximately three seconds without any pauses between spoken or sung words.

15. The computer-implemented method of claim 11, further comprising:
   establishing a two-way communications channel between the second computer system and a conference system, wherein the conference system is configured to receive audio data from any computer device having a communications channel established with the conference system and to transmit the audio data to any computer device having a communications channel established with the conference system; and
   establishing a one-way communications channel between the third computer system and a broadcast system, wherein the broadcast system is configured to receive audio data from the conference system and to transmit the audio data to any computer device having a communications channel established with the broadcast system.

16. A computer system comprising:
   at least one computer processor;
   at least one data store; and
   at least one transceiver,
   wherein the at least one data store is programmed with one or more sets of computer instructions that, when executed, cause the computer system to execute a method comprising:
   receiving, from a mobile device associated with a creator of a media program, a first set of audio data, wherein the first set of audio data was captured by at least one microphone provided in association with the mobile device associated with the creator;
   processing the first set of audio data, wherein processing the first set of audio data comprises:
      amplifying the first set of audio data by a first gain factor; and
      calculating a first level of distortion of the amplified first set of audio data;
   transmitting the amplified first set of audio data to at least one mobile device associated with a listener to the media program;
   determining that a value of the first level of distortion is below a targeted distortion range; and
   in response to determining that the value of the first level of distortion is below the targeted distortion range,
   calculating the second gain factor as a product of:
      a quotient of a high threshold of the targeted distortion range divided by the first level of distortion, to a first exponent calculated based on distortions of representative audio data measured after amplifying the representative audio data by a plurality of gain factors;
      the first gain factor; and
      a gain factor overhead;
   receiving, from the mobile device associated with the creator, a second set of audio data, wherein the second set of audio data was captured by the at least one microphone provided in association with the mobile device associated with the creator;
   processing the second set of audio data, wherein processing the second set of audio data comprises:
      amplifying the second set of audio data by the second gain factor; and
   transmitting the amplified second set of audio data to the at least one mobile device associated with the listener to the media program.

17. The computer system of claim 16, wherein the portion of the first audio data has a duration of approximately three seconds without any pauses between spoken or sung words.

18. The computer system of claim 16, wherein the mobile device associated with the creator is one of:
- a smartphone;
- a tablet computer, or
- a wristwatch, and
- wherein the first set of audio data is captured by at least one microphone provided on the mobile device associated with the creator.

19. A computer system comprising:
- at least one computer processor;
- at least one data store; and
- at least one transceiver,
- wherein the at least one data store is programmed with one or more sets of computer instructions that, when executed, cause the computer system to execute a method comprising:
  - receiving, from a mobile device associated with a creator of a media program, a first set of audio data, wherein the first set of audio data was captured by at least one microphone provided in association with the mobile device associated with the creator;
  - processing the first set of audio data, wherein processing the first set of audio data comprises:
    - amplifying the first set of audio data by a first gain factor; and
    - calculating a first level of distortion of the amplified first set of audio data;
  - transmitting the amplified first set of audio data to at least one mobile device associated with a listener to the media program;
  - determining that a value of the first level of distortion is above a targeted distortion range; and
  - in response to determining that the value of the first level of distortion is above the targeted distortion range, calculating the second gain factor as a product of:
    - a quotient of a high threshold of the targeted distortion range divided by the first level of distortion, to a first exponent calculated based on distortions of representative audio data measured after amplifying the representative audio data by a plurality of gain factors;
    - the first gain factor; and
    - a gain factor overhead;
  - receiving, from the mobile device associated with the creator, a second set of audio data, wherein the second set of audio data was captured by the at least one microphone provided in association with the mobile device associated with the creator;
  - processing the second set of audio data, wherein processing the second set of audio data comprises:
    - amplifying the second set of audio data by the second gain factor; and
  - transmitting the amplified second set of audio data to the at least one mobile device associated with the listener to the media program.

20. The computer system of claim 19, wherein the portion of the first audio data has a duration of approximately three seconds without any pauses between spoken or sung words.

* * * * *